US006343320B1

(12) United States Patent
Fairchild et al.

(10) Patent No.: US 6,343,320 B1
(45) **Date of Patent: *Jan. 29, 2002**

(54) AUTOMATIC STATE CONSOLIDATION FOR NETWORK PARTICIPATING DEVICES

(75) Inventors: Steven E. Fairchild; John M. Hemphill; James A. Rozzi, all of Harris County, TX (US)

(73) Assignee: Compaq Information Technologies Group, L.P., Houston, TX (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/094,007

(22) Filed: Jun. 9, 1998

(51) Int. Cl.[7] .................... G06F 13/00
(52) U.S. Cl. .................... 709/224
(58) Field of Search .................... 370/13, 397, 349, 370/315; 364/705; 395/200, 800; 709/223, 224

(56) References Cited

U.S. PATENT DOCUMENTS

| | | | | | |
|---|---|---|---|---|---|
| 4,975,829 | A | | 12/1990 | Clarey et al. | 364/200 |
| 5,430,845 | A | | 7/1995 | Rimmer et al. | 395/275 |
| 5,475,836 | A | | 12/1995 | Harris et al. | 395/600 |
| 5,522,042 | A | | 5/1996 | Fee et al. | 395/200.01 |
| 5,559,958 | A | | 9/1996 | Farrand et al. | 395/183.03 |
| 5,561,769 | A | | 10/1996 | Kumar et al. | 395/200.05 |
| 5,566,160 | A | * | 10/1996 | Lo | 370/13 |
| 5,572,195 | A | | 11/1996 | Heller et al. | 340/825.35 |
| 5,581,478 | A | | 12/1996 | Cruse et al. | 364/505 |
| 5,608,907 | A | * | 3/1997 | Fehskens et al. | 395/672 |
| 5,623,495 | A | * | 4/1997 | Eng et al. | 370/397 |
| 5,642,303 | A | * | 6/1997 | Small et al. | 364/705 |
| 5,717,689 | A | * | 2/1998 | Ayanoglu | 370/349 |
| 5,812,865 | A | * | 9/1998 | Theimer et al. | 395/800 |
| 5,822,309 | A | * | 10/1998 | Ayanoglu et al. | 370/315 |
| 5,862,345 | A | * | 1/1999 | Okanoue et al. | 395/200 |

OTHER PUBLICATIONS

Muralidharan, Baktha; IEEE Journal on Selected Areas in Communications; vol. 11, No. 9; Dec. 1993; pp. 1336–1345.

* cited by examiner

*Primary Examiner*—Robert B. Harrell
(74) *Attorney, Agent, or Firm*—Akin, Gump, Strauss, Hauer & Feld, L.L.P.

(57) ABSTRACT

A network including one or more network subnets, a plurality of network participating devices (NPDs) and at least one management server. Each NPD initializes, gathers its status information and sends an initial beacon packet on each subnet to which it is coupled. The beacon packets are preferably confined to the subnet and are not copied to other subnets. For each subnet, each NPD collects beacon packets sent by other NPDs on the same subnet and stores the status information into a local status database including consolidated state information of all the NPDs in the group. For each subnet, each NPD periodically sends subsequent beacon packets with its status information so that all of the active NPDs have the most recent status information for all other NPDs of the same subnet. For each subnet, each NPD examines its configuration and determines whether it can serve as a group master. If a NPD can serve as master, it periodically determines whether it is ASC group master of each subnet to which it is coupled using the same criterion as the other NPD(s) on the same subnet. The same criterion is used to ensure a single master, so that only one ASC group master is selected for each group or subnet.

24 Claims, 8 Drawing Sheets

AUTOMATIC STATE CONSOLIDATION FOR NETWORK PARTICIPATING DEVICES

FIELD OF THE INVENTION

The present invention relates to system and network management, and more particularly, to a method and system for consolidating management state information of one or more devices attached to or participating in a network, and sending the consolidated information to one or more management servers.

DESCRIPTION OF THE RELATED ART

In computer network environments, it is advantageous to manage the various software and hardware components coupled to the network from a central location or from a remote location. Such central or remote management of a network is commonly accomplished using industry standard protocols, such as the Simple Network Management Protocol (SNMP) or the Desktop Management Interface (DMI). Traditional network discovery is performed in one of the several ways. One method is called explicit discovery, where the network address of the device is explicitly specified to the management software. Another traditional method is Internet Protocol (IP) pinging, where the management software enumerates a range of network addresses and individually pings the addresses to detect active devices. Yet another traditional method is performed using router tables, where the management software collects potential device addresses from network router tables.

In the case of explicit discovery, it is necessary to learn the address of each device and enter the value in the management software. This is a time consuming process in a network of any substantive size. Additionally, since many devices are dynamically assigned network addresses, the explicitly entered information may become invalid with the passage of time. IP pinging is time consuming, consumes network bandwidth, and may produce inconclusive results. Additionally, when the presence of the device is detected, no information as to what sort of device has been detected is available. The use of router tables is also subject to similar deficiencies as IP pinging. In all of these traditional cases, the fact that the address of a device can be dynamically changed is an ongoing problem. Once a device's address is changed, the management software is no longer be able to communicate with it. These techniques rely on low level network protocols, and changes in network infrastructure technology often renders these traditional methods less effective or even non-effective.

Another requirement to managing devices attached to or otherwise participating in a network is to continuously monitor the state of those devices. One traditional method to monitor devices is to periodically poll the devices. Typically, a management server uses a management protocol, such as SNMP, to query each device to determine its state. On the basis of the response received from the device, an assessment of the state of the device is made. Several possible results are obtained from a device poll, including, but not limited to: 1) no response, where the device is either inoperative or network connectivity has been lost; 2) same response, where the device indicates that its state is the same as it was during the previous poll; 3) changed response, where the device indicates that its state is different than it was during the previous poll, such as, for example, degraded or upgraded, etc.

Continuous device polling generates an unacceptable amount of network traffic. Additionally, most of the polling traffic reveals that there is no change in the device state, so that the poll is wasted since it did not generate new information. To obtain and maintain device state information that is the most accurate, a system using traditional techniques would have to consume an unacceptable amount of the available network bandwidth. Additionally, another consideration in polling for device state information is the ability of the management computer system to support a high level of network traffic that would be required by polling. In a network with a large number of devices, the frequency of polling is constrained by the processing power and network bandwidth of the management computer system.

It is desired to provide a system and network management system with improved monitoring of devices attached to or otherwise participating in a network. It is desired to reduce network traffic related to management functions, such as monitoring, and to enable device information to remain updated regardless of network changes. It is desired to provide updated information about devices upon initialization and continuously or periodically during operation, rather then requiring continued extraneous communication and/or polling that would otherwise consume valuable network bandwidth.

SUMMARY OF THE INVENTION

A device that supports automatic state consolidation according to the present invention couples to a network subnet or otherwise participates in a network via the network subnet. The device includes a management database that stores local status information of the device and external status information from other, similar devices coupled to the network subnet. The device further includes beacon logic that periodically sends beacon packets onto the subnet, where each beacon packet includes the local status information from the management database. The device further includes monitor logic that stores external status information into the management database from beacon packets received from external devices sent via the subnet, and forward logic that periodically determines if it is master, and if it is master, that periodically forwards the local and external status information from the management database onto the subnet while it is master.

In this manner, each of a plurality of such devices coupled to a network subnet has a database with updated status information of all of the devices. The status information is periodically forwarded via the subnet to another device in the network, such as one or more management servers. The forward logic, if it determines that is master, forwards the local and external status information either periodically, if there is a change in the local and external status information, or a combination of both. In this manner, a management server is always apprised of the status of devices on the subnet.

The device may include one or more management agents that each collect the local status information and that stores the local status information into the management database. The device may further include registration logic that stores server information from a server beacon packet received from the network subnet and that forwards the server information to the subnet using a server beacon packet. The device may further include communication logic that operates with the beacon logic, the monitor logic and the forward logic to enable communication on the network subnet according to the HyperText Transfer Protocol (HTTP). The forward may forward the local and external status information via the communication logic in the form of an HTTP post transaction including an entity body. An HTTP tag or the like may be provided to identify the type of entity body, which may further include a Multipurpose Internet Mail Extension (MIME) descriptor or the like.

The local and external status information may include a plurality of beacon intervals, where one beacon interval is provided for each of the devices on the subnet. Each beacon interval may determine, for example, how often the corresponding beacon logic of a device sends beacon packets on the network subnet. The forward logic bases its determination of being master at least in part on comparisons of the plurality of beacon intervals. In one embodiment, for example, the device having the shortest beacon interval is determined to be master. Each device on a given subnet also has an unique address, such as an IP address or the like. In the event two or more devices have the same beacon interval, the forward logic further determines whether it is master on a comparison of a unique addresses. In any event, the criterion used to determine which device is master ensures that only one device is master at any given time.

The network may include two or more network subnets and one or more filter devices, such as routers or the like, coupled between respective network subnets. The beacon packets may be broadcast packets that are filtered by the filter device so that the beacon packets are not transferred to other subnets. For example, each subnet may include a separate group of devices, where the beacon packets from each group are isolated from the beacon packets of other groups. This reduces the amount of network traffic on the network as a whole. When forwarding consolidated status information comprising the local and external status information to a management server, the forward logic may send a unicast packet via a network subnet. The unicast packet includes an address for a particular device in the network, such as a management server, where the filter devices relay the unicast packet to the appropriate subnet to which the management server is coupled.

A method of consolidating status information of a plurality of devices coupled to a first network subnet and for sending consolidated information to a management server according to the present invention comprises steps of periodically sending, by each of the plurality of devices, status information to the other of the plurality of devices on the first network subnet, receiving and storing, by each of the plurality of devices, status information received from the other of the plurality of devices, selecting one of the plurality of devices as master, and periodically sending, by the selected master, consolidated status information of the plurality of devices in a consolidated form to the management server. The consolidated status information forwarded to the master may be sent periodically, or may be sent if a change occurs in the consolidated status information, or may be sent according to a combination of a predetermined period and whether there is a status change. The selecting of a master may comprise determining, by each of the plurality of devices, whether it is master based on a common selection criterion that ensures only one master.

The method may further comprise steps of receiving, by one of the plurality of devices, server information from the management server, and forwarding the server information to the other of the plurality of devices on the first network subnet. In this manner, all of the devices on the subnet or part of the same group, have the server information, so that any device that can serve as master may locate the management server. Of course, more than one management server may register, so that all devices have the server information of all management servers that have registered.

It is appreciated that automatic state consolidation for network participating devices according to the present invention provides a network management system with improved monitoring of devices attached to or otherwise participating in a network. Automatic state consolidation reduces network traffic related to management functions, such as monitoring, and enables device information to remain updated regardless of network changes. Automatic state consolidation provides updated information about devices upon initialization and periodically during operation, rather then requiring continued extraneous communication and/or polling that would otherwise consume valuable network bandwidth.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENTS

Figure 1:
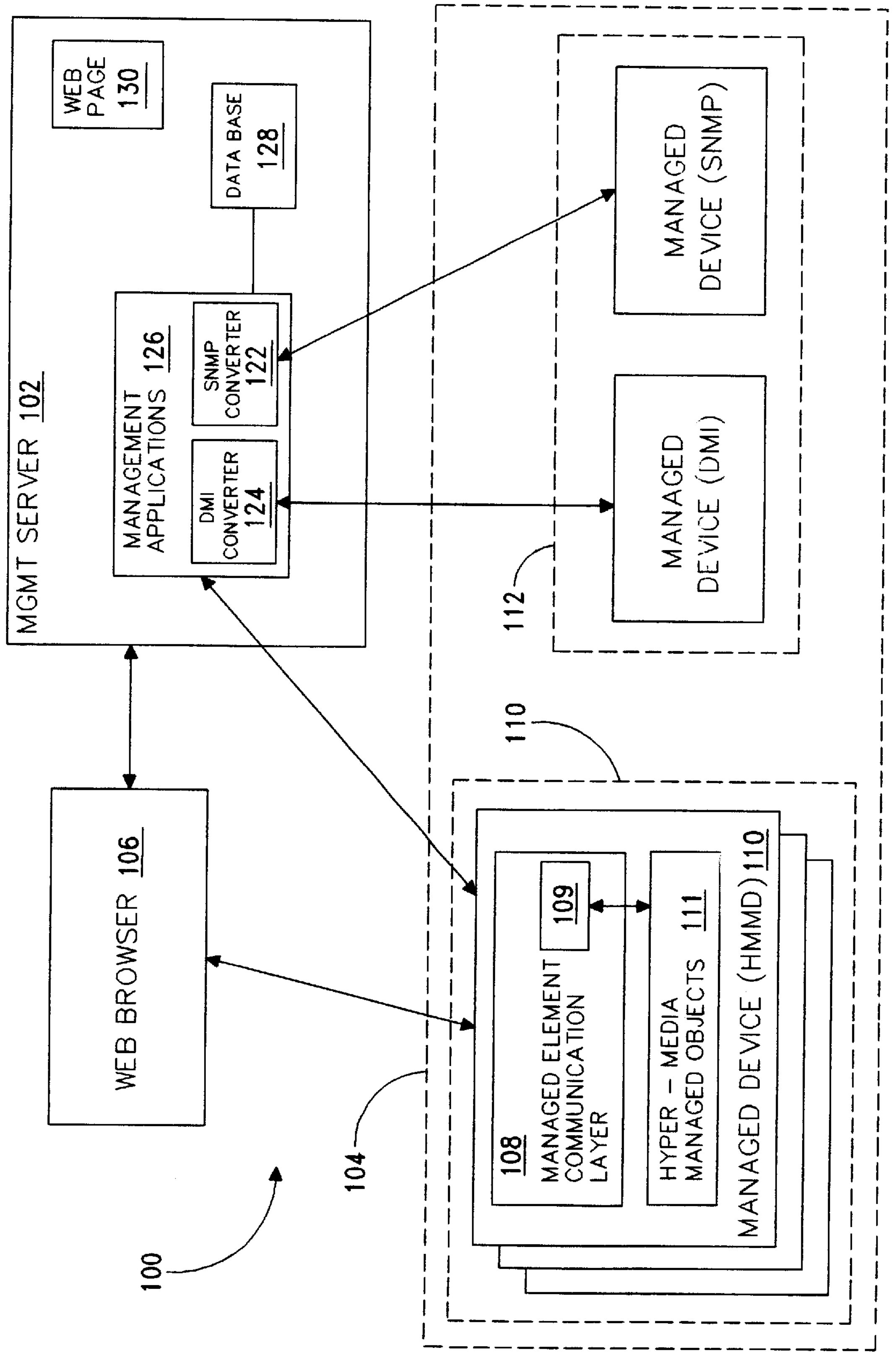
FIG. 1 is a block diagram of a web-based management network.

Referring now to FIG. 1, a block diagram of a web-based management network 100 is shown. A management system according to the present invention, such as the management network 100, enables management of both hardware and software components over a network using Internet technology. The management network 100 includes a management server 102, one or more managed elements 104, and a client system 106 that are coupled together using any one or more network architectures or technologies, such as Ethernet®, ATM, Token Ring, etc. The management network 100 preferably supports the World Wide Web (WWW), which is an Internet technology that is layered on top of the basic Transmission Control Protocol/Internet Protocol (TCP/IP) services. The management network 100 may be any type of network or network topology such as a separate intranet, part of the Internet itself, an intranet with access via a gateway or firewall to the Internet, etc.

The managed elements 104 generally include computer systems including one or more network interface cards (NICs) or the like, such as desktops, portables, personal computer systems (PCs), servers, workstations, etc. as well as other networking devices, such as switches, routers, repeaters, hubs, etc. The managed elements 104 are generally divided into two different types, including web-enabled devices or Hyper-Media Managed Devices (HMMDs) 110 and legacy devices 112. The legacy devices 112 include those devices implemented with the Simple Network Management Protocol (SNMP), the Desktop Management Interface (DMI), or similar type management systems known to those skilled in the art.

The HMMDs 110 each include one or more management agents called Hyper-Media Managed Objects (HMMO) 111, described further below. In the preferred embodiment, the HMMDs 110 each convert management data into a form that may be browsed using Internet technology, which may incorporate TCP/IP, Universal Resource Locator (URL), HyperText Transfer Protocol (HTTP), HyperText Markup Language (HTML), JavaScript, etc. A managed element communication layer (MECL) 108 including one or more servers 109 is provided at the front end of the HMMOs 111 for providing security of and access to management data of the corresponding HMMD 110. The servers 109 preferably operate as HTTP servers, and a separate server 109 is loaded and operated within the MECL 108 for each installed HMMO 111.

The client system 106 supports TCP/IP and includes a web browser for accessing and displaying management information from the management server 102 or any of the HMMDs 110. Examples of web browsers include MicroSoft® Internet Explorer for Windows 95® or Windows NT® and Netscape Navigator™ for Windows 95®, Windows NT® or HP/UX by Hewlett Packard. Other web browsers are contemplated as well. It is desired that the web browser support a scripting language, such as JavaScript or the like. Scripting language includes instructions interpreted by the browser to perform certain functions, such as how to display data. The client system 106 generally replaces the management console of an SNMP management system, providing access to either the HMMDs 110 or the management server 102.

The management server 102 preferably uses an appropriate operating system (OS) such as Windows NT® or the like. The management server 102 also executes or otherwise operates as a Hyper-Media Management Application (HMMA) that provides management services for all of the managed elements 104 including the HMMDs 110 and the legacy devices 112. The management server 102 may serve as the aggregation point for all management information of the management network 100 and provides a unified data model, in which data from the legacy devices 112 (SNMP, DMI, etc.) and data from the HMMDs 110 are consolidated into a common form. As such, the system and network management is unified and allows for easier integration and navigation between applications.

The management server 102 accesses management data from the HMMDs 110 and controls those devices using Internet technology. The HMMOs 111 may operate as self-describing web agents that use common web-enabling components to provide registration, discovery, security and HTTP communications. The HMMO web agents render information in HTML, or in scripting language, or a combination of both, for viewing by a browser on the client system 106. The information may also be sent directly to the management server 102. The management server 102 also converts data from the legacy devices 112 into a form that may be browsed. For example, the management server 102 includes an SNMP converter 122 that converts SNMP-based data from SNMP managed devices to HTML, and a DMI converter 124 that converts DMI-based data from DMI managed devices to HTML. The management data from the managed elements 104 is stored in a management database 128 maintained on the management server 102. The SNMP converter 122 and the DMI converter 124 are examples of management applications 126, which are plug-in modules used to perform the functions or otherwise expand the capabilities of the HMMA. In this manner, the management server 102 is adaptable and flexible depending upon specific embodiment needs. The management server 102 also generates a home page 130 accessible by any appropriate web browser, such as that executing on the client system 106 or on the management server 102 itself The management server 102 provides a management foundation, which includes discovery of manageable devices, performance of event management and determination of device status and device groups. The database 128 preferably includes events, discovered devices, device status, user preferences and user-specified data that is actively monitored. The management server 102 performs management services to discover managed elements 104 of the management network 100 and to track the device state of all of the managed elements 104. The management server 102 may discover devices on the network using IP pinging for IP devices, SAP broadcasts for Internetwork Packet Exchange (IPX) devices and is extendable to enable other discovery mechanisms. The management server 102 periodically collects and saves configuration information in the database 128 in a common form regardless of whether the information was originally web-based, SNMP or DMI. For example, the management server 102 stores events and traps, and enables configuration of filters that ultimately generate queries that are used to select records from the database 128. The management server 102 also enables access of the database 128. The database 128 is preferably based on SQL Server by Microsoft® and is accessed via Java™ DataBase Connectivity (JDBC) or Object DataBase Connectivity (ODBC). SQL views are created to abstract the database 128 for reporting purposes.

The management server 102 enables the user to select a managed element 104 and view detailed information about that device. The management server 102 also enables a user to create device groups for business process views by filtering for selected devices and for selected events of those devices. The management server 102 handles events, such as SNMP traps and HTTP alerts, logs the events and allows a user to set event filters.

As described previously, the client system 106 includes a web browser for accessing and displaying management information from the management server 102 and any of the HMMDs 110. For example, the client system 106 sends an HTTP request in URL format to an HMMD 110, which is received by the MECL 108 of that HMMD. The MECL 108 accesses an index page for the HMMD 110, or the request is transferred to one of the servers 109 for a corresponding one of the HMMOs 111. Each HMMO 111 formulates or renders a corresponding web page using HTML and/or scripting language, which is passed back to the client system 106 for rendering and display via the server 109 of the MECL 108. The client system 106 accesses the home page 130 or data from the database 128 in a similar manner using TCP/IP and another URL. The management server 102 may also perform security functions.

It is noted that the legacy devices 112 are managed and controlled by the management server 102 as usual according to the particular protocol supported (SNMP, DMI), so that the client system 106 might not necessarily have direct access. Nonetheless, the client system 106 has access and control of the legacy devices 112 via the management server 102. In this manner, it is appreciated that the client system 106 may be located anywhere on the Internet to access and control all of the managed elements 104 of the management network 100.

One of the primary goals of the management network 100 is to ensure a continuous operation of the network with as little down time as possible by isolating and solving problems. The management server 102 provides the base for software modules to expose and present the solutions to problems that exist within the management network 100. The act of finding problems, reducing the complexity in analyzing or diagnosing problems, and helping to resolve problems is referred to as Action Oriented Management (AOM). AOM comprises several concepts, including discovering and defining a problem, determining the course of action(s) to take based on the problem, and providing the resolution to the problem, where the resolution may be performed either programmatically or by providing a list of steps for the user to follow.

There are many categories of actions that the management server 102 discovers. One action category is hardware fault detection, which is a category of actions identifying problems with hardware. Examples of hardware fault detection include failures or predictive failures on hard drives, processors, and memory. Most problem resolutions in the hardware fault detection category are simply identified steps that the user must follow to correct the problem. Tools in this category allow viewing of the problem. Another action is software configuration actions, which are actions that identify potential problems with software configurations. Software configuration actions use version control functionality along with the concept of a "software set". The user establishes a set of software that should be loaded on a server, and this category of actions identifies any deviations from that set, and differences between the set and the latest software. Problem resolution for software configuration allows distribution of software updates, along with retrieval of new software. Tools in this category include software distribution, Internet download, and report generation.

Another action category is thresholds, which are actions that track situations on the network identified by combinations of data. The user has to configure the situations. The threshold tools allow the user to monitor management data and be notified whenever certain conditions arise. Another action category is action advisories, which are actions that notify the user whenever an event is needed to be performed, such as service advisories generated by the manufacturer of the management server 102. Other advisory examples include backups, disk storage cleanup, etc. Tools for this category provide the details of the action advisory and may allow corrective action. Another action category is software updates, which are actions that notify the user whenever a new software update to software on their network becomes available on a corresponding web site. Tools for this category allow the new update to be fetched from servers setup on a user's network. Another action category is traps, which are actions that occur when an SNMP trap, an HTTP event, a DMI indication, or similar types of traps or events is received. The trap is turned into an action that is operated on just as any other action. The tools in this category allow the user to forward the trap to other management consoles, to page the user, provide correlation, etc.

In general, management is often classified by what is being managed: Hardware, Operating System, Software, etc. The following Table 1 illustrates the layers and the management data that is typical of that layer. It is noted that Table 1 is by no means exhaustive and simply provides typical management data for the corresponding layer.

TABLE 1

Management Layers and Corresponding Typical Management Data

| Managed Layer | Examples of managed data at each layer |
|---|---|
| Applications (highest layer) (Vertical, specialized applications) | Transactions per second<br>Application specific data, such as status of batch processing activities |
| Databases, web servers, So-called "Horizontal" applications | Table space used<br>Number of locks set<br>Resources used - percent of system work areas, etc. |
| Operating System | Number of processes<br>Interrupts per second being serviced<br>Per cent of CPU time spent in user state<br>Names of processes |
| Hardware (lowest layer) | Configuration: serial number of disk drive, bytes of RAM installed, etc.<br>Operational: number of bytes sent by Ethernet controller, number of packet collisions on Ethernet, temperature of CPU cabinet, etc. |

Figure 2:
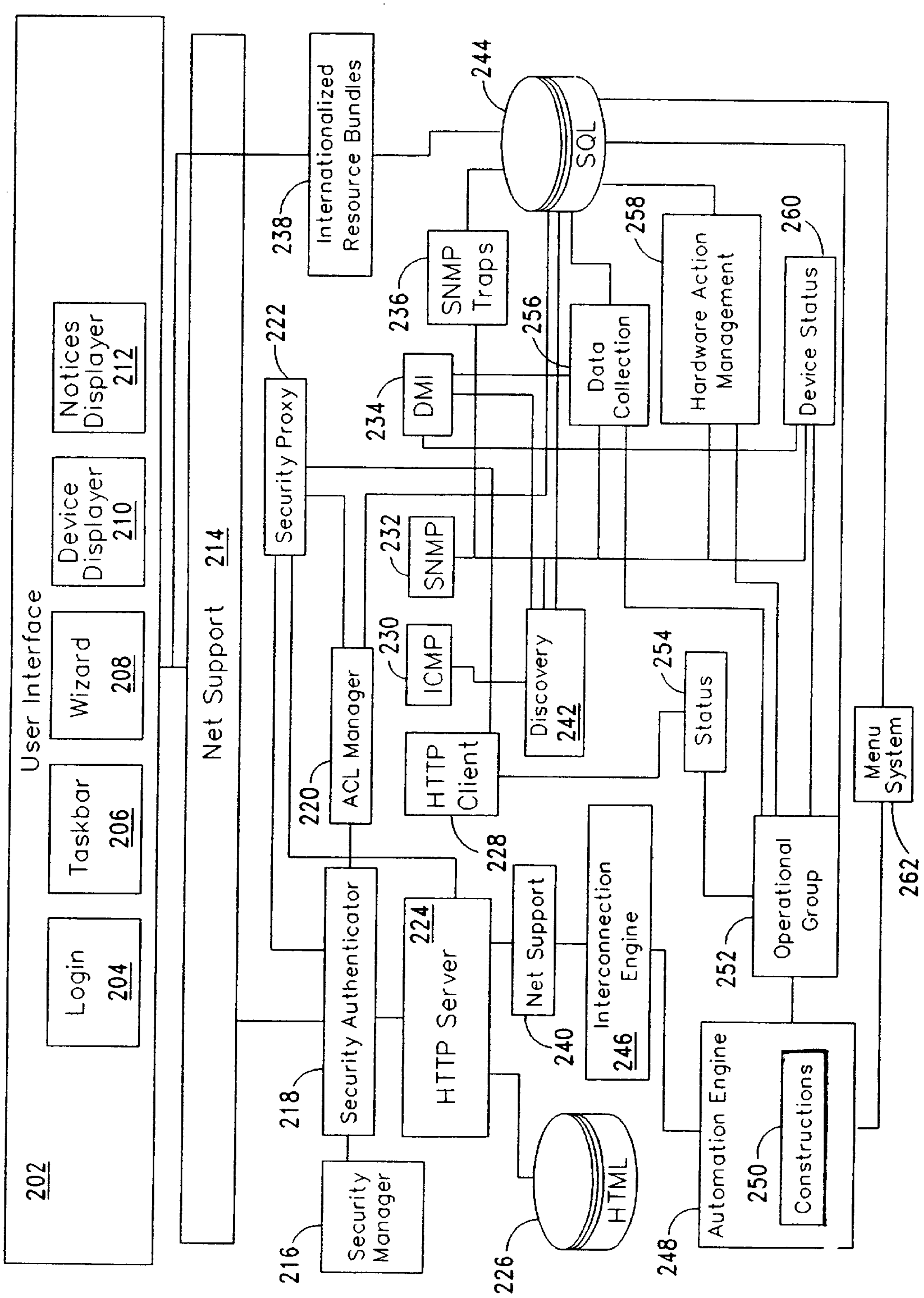
FIG. 2 is a more detailed block diagram of the management server of FIG. 1.

Referring now to FIG. 2, a more detailed block diagram of the management server 102 is shown. A User Interface 202 is provided with a plurality of modules that are preferably rendered on a web browser of the management server 102. The User Interface 202 includes a Login module 204, a Taskbar module 206, a Wizard module 208, a Device Displayer module 210 and a Notices Displayer module 212. The Login module 204 is a login applet which gains the user access to the management server 102. The Taskbar module 206 includes management server menus. The Wizard module 208 includes applets for guiding and assisting the user through tasks on the management server 102. The Device Displayer module 210 is an applet which displays information about selected devices. The Notices Displayer module 212 is an applet which displays event-based information. A Net Support layer 214 interfaces the User Interface 202 and includes Java™ or JavaScript classes that underlie other components that handle asynchronous communications to and from the management server 102.

The management server 102 includes a Security Manager module 216, which manages creation, deletion and modification of user accounts. The Security Manager module 216 interfaces a Security Authenticator module 218, which checks incoming requests for proper access rights and denies access if appropriate. The Security Authenticator module 218 interfaces the Net Support module 214 and an Access Control List (ACL) Manager module 220, which manages the privileges associated with each type of user account. The ACL Manager module 220 and the Security Authenticator module 218 each interface a Security Proxy module 222, which proxies requests from the user's browser to web agents, adding necessary security information to avoid having to log in to each web agent.

The Security Authenticator module 218 and the Security Proxy module 222 each interface an HTTP Server module 224, which runs at an alternate port for special purpose enterprise management. The HTTP Server module 224 interfaces an HTML database 226, which includes miscellaneous HTML pages and scripts used by the User Interface 202 of the management server 102. The Security Proxy module 222 interfaces an HTTP Client module 228, which is used to initiate HTTP requests to other devices. An ICMP module 230 sends ICMP packets on the network to implement IP pinging, if necessary. An SNMP module 232 is provided which includes SNMP communications modules.

A DMI module 234 is provided which includes DMI communications modules. The SNMP module 232 interfaces an SNMP Traps module 236, which handles the reception of SNMP traps and converts them to management server notices. The User Interface 202 interfaces an Internationalized Resource Bundles module 238, which manages resource bundles for applets for different languages. The SNMP Traps module 236 and the Internationalized Resource Bundles module 238 each interface a SQL database 244, which includes discovery, device, activity and results information and corresponds to the management database 128. A Discovery module 242 interfaces the ICMP module 232, the SNMP module 232, the DMI module 234 and the SQL database 244. The Discovery module 242 finds devices on the management network 100 and identifies them.

The HTTP Server module 224 interfaces a Net Support module 240, which comprises a server side portion of communication to applets (Net Support in browser) that activates server functionality based on incoming requests, and returns results and other asynchronous notification information. The Net Support Module 240 interfaces an Interconnection Engine module 246, which is responsible for connecting together events with the listeners of the events. The Interconnect Engine module 246 has support for registering to receive events and for firing events. The Interconnect Engine module 246 interfaces an Automation Engine module 248, which loads constructions, fetches components and sets object properties to perform management functions. The Automation Engine module 248 supports conditional operations that affect the next operation performed, based on the results of a completing operation. The Automation Engine module 248 includes a Construction module 250, which operates as a listener of events composed of many components wired together to perform one management function or a portion of a management function.

The Automation Engine module 248 interfaces an Operational Group module 252, which accesses the SQL database 244, runs SQL queries periodically and performs the specified management functions upon addition or removal of a device or event from the result set. The HTTP Client module 228 and the Operational Group module 252 interface a Web Agent Status module 254, which performs a management function to track the status of web agents. The DMI module 234, the SNMP module 232 and the Operational Group module 252 interface a Data Collection module 256, which performs a management function to collect configuration data from devices and saves the configuration in the SQL database 244. The SNMP module 232 and the Operational Group module 252 interface a Hardware Action Management module 258, which performs a management function that takes further action to try and resolve hardware problems or check on whether the problem still exists. The Hardware Action Management module 258 accesses the SQL database 244. The DMI module 234, the SNMP module 232 and the Operational Group module 252 interface a Device Status module 260, which performs a management function that tracks the status of SNMP and DMI devices. A Menu System module 262 interfaces the Automation Engine module 248 and accesses the SQL database 244 and builds menus for the User Interface 202 based on user privilege, language and location.

Figure 3:
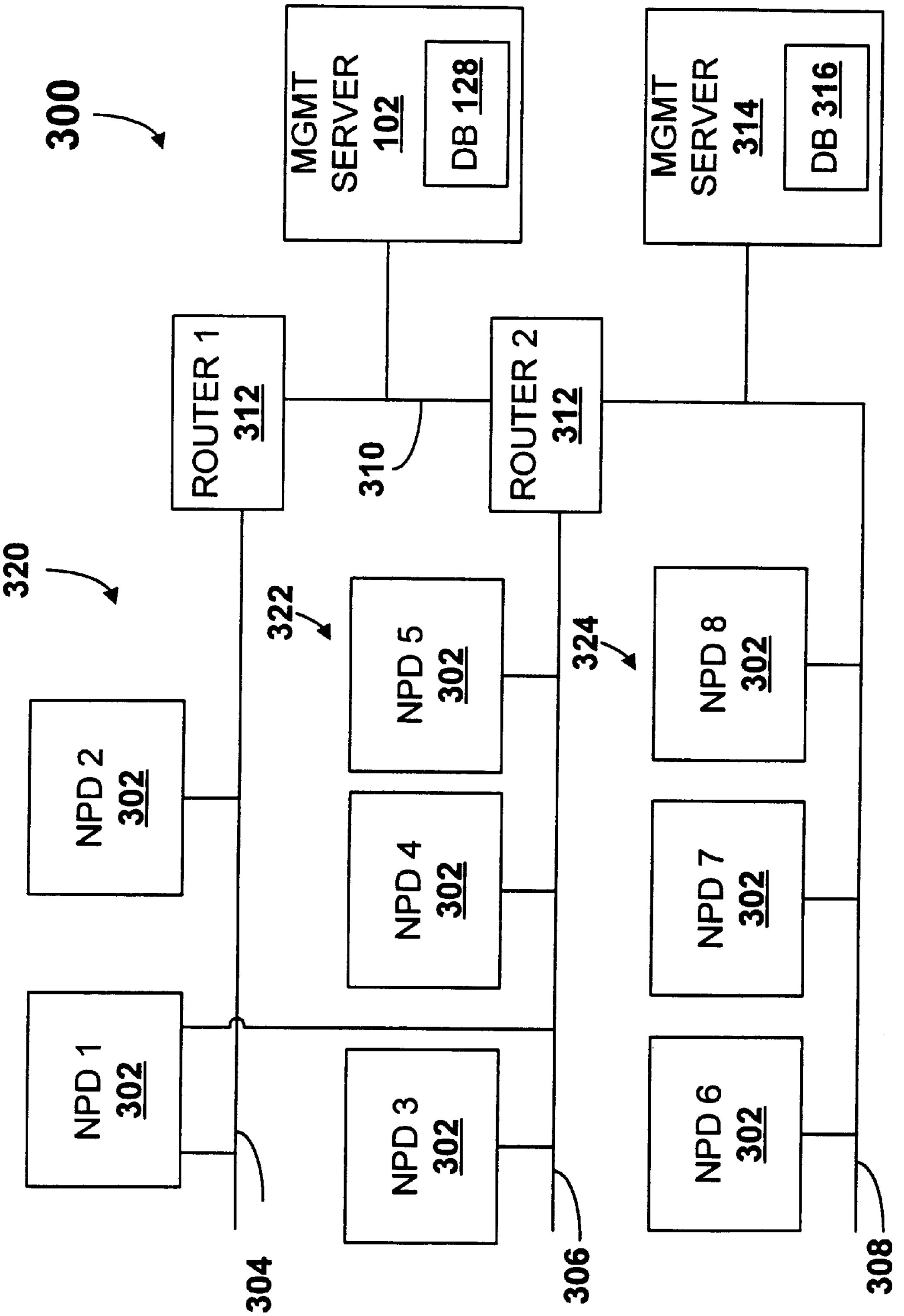
FIG. 3 is a simplified block diagram illustrating a management network that supports automatic state consolidation (ASC) for consolidating state or management information of one or more network participating devices (NPDs) according the present invention.

Referring now to FIG. 3, a block diagram is shown of a network 300 implemented with automatic state consolidation (ASC) for consolidating state or management information of one or more network participating devices (NPDs) 302. Such consolidation of management information reduces the network bandwidth required to perform management functions and further reduces computational software required by management application software. As described herein, ASC is implemented as a peer to peer communication protocol where the peers are organized into logical groups. The logical grouping may be based on any logical criterion, such as, for example, ranges of addresses. In the embodiment described herein, addresses are preferably 32-bit Internet Protocol (IP) addresses where each peer in a group has the same upper 24 bits (corresponding to first three numbers provided in the standard dotted quad notation) and where peers in each group are organized according to the lowest octet of the IP address (the last number provided in the standard dotted quad notation).

Each NPD 302 may be implemented in a similar manner as any of the managed devices previously described, including the HMMDs 110 and the legacy devices 112, and may comprise any type of computer with one or more NICs, such as a server, desktop, portable, PC, workstation etc., or any type of system device or any type of network device, such as a router, switch, repeater, hub, etc. The NPDs 302 are coupled to one of several network segments or "subnets" 304 or 306 or 308 or 310 in any desired manner depending upon the type of media and architecture or technology, such as Ethernet®, ATM, Token Ring, etc. The network 300 preferably supports the World Wide Web (WWW) and TCP/IP services. The network 300 may be any type of network or network topology such as a separate intranet, part of the Internet itself, an intranet with access via a gateway or firewall to the Internet, etc.

A plurality of NPDs 302 are provided in the network 300 as shown in FIG. 3. In particular, two NPDs 302, individually labeled NPD 1 and NPD 2, are coupled to the subnet 304, three more NPDs 302, or NPD 3, NPD 4 and NPD 5 are coupled to the subnet 306 and another three NPDs 302, or NPD 6, NPD 57 and NPD 8 are coupled to the subnet 308. It is noted that any NPD 302 may be coupled to more than one subnet at a time, such as a computer system including a first NIC coupled to one subnet, a second NIC coupled to a second subnet, etc. For example, the NPD 1 is also coupled to the subnet 306.

The subnets 304, 306 and 308 are separated by routers 312. A first router 1 is coupled to the subnet 304 and a second router 2 is coupled to the subnets 306 and 308. The routers 1 and 2 are coupled together via another subnet 310. The management server 102 is shown coupled to the subnet 310, although it may be coupled anywhere in the network 300. Furthermore, any number of management servers may be provided, where each monitors and manages any one or more of the NPDs 302 of any of the subnets. For example, another management server 314 including a management database 316 is shown coupled to the subnet 308. The embodiment shown in FIG. 3 is exemplary only and it is understood that any practicable number of NPDs 302, routers 312, subnets and management servers may be included in a particular network.

An appropriate discovery procedure is preformed to enable each management server, such as the management servers 102, 314, to communicate with managed devices within the network 300, such as any NPDs 302 coupled via subnets 304, 306, 308, etc. Each management server also sends information via its corresponding subnet to the routers 312 to inform the NPDs of server information to communicate with that server, such as server network addresses, names and/or port numbers, etc. to enable the NPDs 302 to communicate with that management server. For example, the management server 102 sends information via the subnet 310 to the routers 1 and 2 to inform the NPDs 302 of the necessary information to communicated with the management server 102.

The NPDs 302 are organized into groups according to the particular subnet to which they are attached or otherwise participating. In particular, the NPDs 1 and 2 form a first group 320, the NPDs 1, 3, 4 and 5 form a second group 322 and the NPDs 6, 7 and 8 form a third group 324. As noted, a NPD 302, such as NPD 1, may have multiple addresses and thus may belong to more than one group at the same time. For example, NPD 1 may comprise a computer system with multiple NICs, each NIC having a different address. The NICs may be in the same group or may be in as many groups as there are NICs in the NPD 302. The addresses assigned to the NPDs 302 preferably correspond to the groups to which they belong. For 32-bit IP addresses according to TCP/IP, for example, each NPD includes an IP address in which the high order 24 bits for a given group are the same, so that NPDs 1 and 2 have an IP address with the same high order 24 bits, the NPDs 1, 3, 4 and 5 have an IP address in which the high order 24 bits are the same, etc. Note that in FIG. 3, the NPD 1 includes two different IP addresses. The particular IP addresses corresponding to each of the groups of NPDs 302 are distinguished by the lower octet of the IP address. In this manner, each subnet is a TCP/IP subnet defined to be a range of IP addresses that are unique in the network 300. For example, using standard dotted quad notation, a NPD having an IP address of 132.132.132.25 is in the same group as another NPD having an IP address of 132.132.132.200, whereas a NPD having an IP address of 132.132.133.25 is in a different group.

Each NPD 302 monitors status and/or management information associated with that device, referred to as the local status information, and stores the information locally as described more fully below. Each NPD 302 in a given group periodically sends its status or management information to the other NPD(s) 302 in the same group, so that all NPDs 302 have a copy of the status information of every other NPD 302 in a group. The status information from the other NPDs in the group and stored locally is referred to as external status information. Thus, the NPDs 1, 3, 4 and 5 of the group 322 each periodically send status information via the subnet 306 to all of the other NPDs in the group 322. The same is true for the groups 320 and 324. In one embodiment, an appropriate protocol is used to enable communication to occur on each subnet without the communication being transmitted to any other subnet. For example, UDP (User Datagram Protocol) is used by each NPD 302 to send broadcast packets that are filtered by the routers 312 from being sent to other subnets. Thus, an IP network packet that is generated by a NPD 302 on subnet 306, such as NPD 3, that has a destination for another NPD coupled to subnet 306, such as NPD 5, is asserted on the network media of subnet 306 but is filtered by Router 2 and is not forwarded to any of the other subnets 308, 310, etc. NPD 1 receives the packet from NPD 3 since it is also on the subnet 306.

One NPD 302 in each group operates as an ASC group master to transfer management and status information of all the NPDs 302 in a given group to a management server, such as the management server 102. The ASC group master uses the appropriate protocol to send a packet to a management server using a corresponding address and port number of that management server. In general, an IP unicast packet that is generated by a NPD 302 on the subnet 306, such as NPD 3 on subnet 306, that has an IP address indicating a destination for a device on a different subnet, such as the management server 102 on the subnet 310, is transferred by Router 2 to the subnet 310. The management server 102 may also communicate with NPD 3 by sending a unicast packet with an address identifying NPD 3 onto the subnet 310, which is routed to the subnet 306 by router 2.

It is noted that the use of broadcast packets enables NPDs 302 on a given subnet to communicate with each other without adding extraneous traffic on other subnets. Thus, the NPDs 6, 7 and 8 of the group 324 are able to periodically update each other via subnet 308 without having the packets sent to any of the other subnets 304, 306 or 310. The use of unicast packets enables any of the NPDs 302 to communicate with a management server, such as either management server 102 or 314, regardless of where on the network 300 that the target management server is located.

Figure 4:
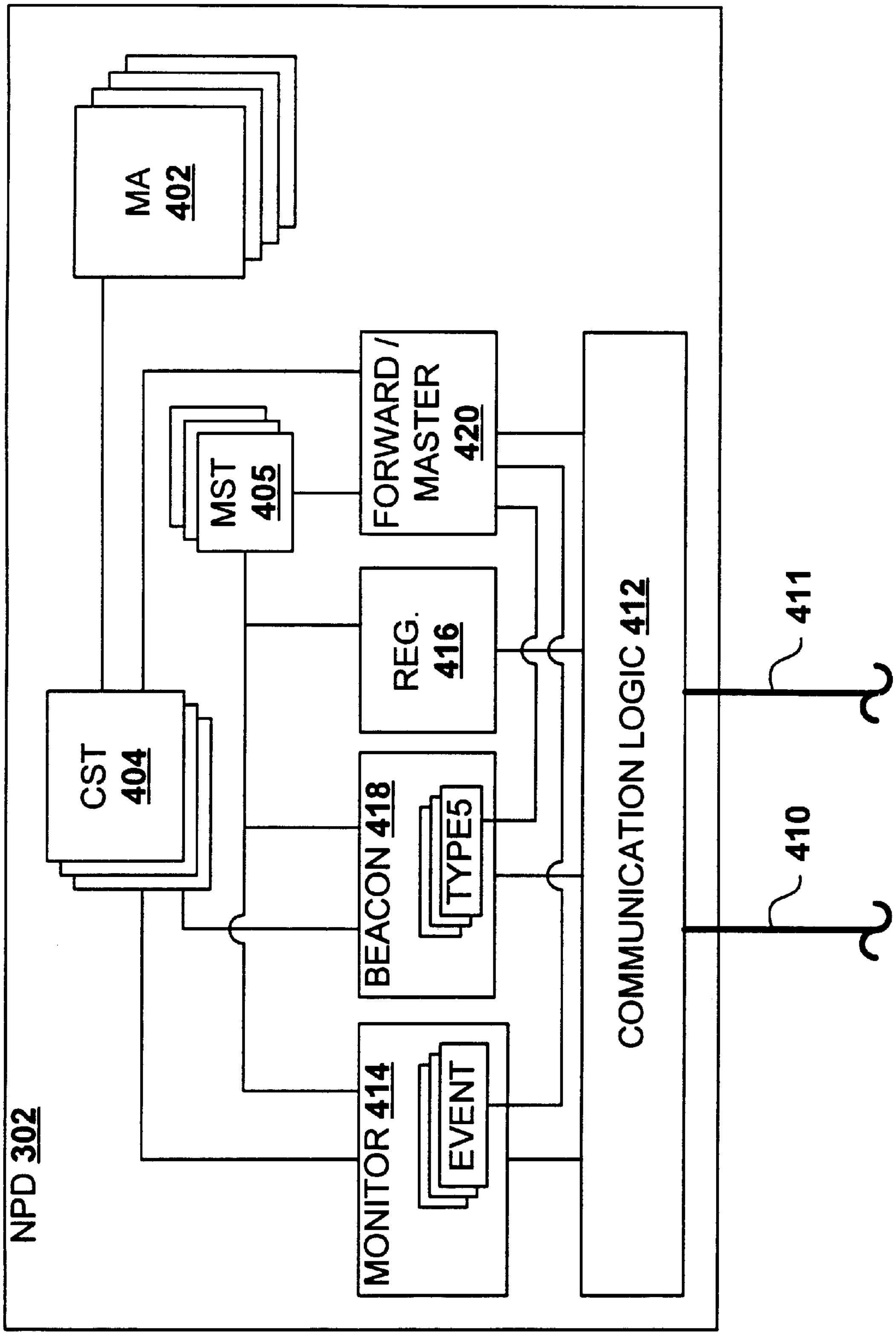
FIG. 4 is a more detailed diagram of an exemplary network participating device representing any of the NPDs of FIG. 3.

Referring now to FIG. 4, a more detailed diagram is shown of an exemplary NPD 302 that represents any of the NPDs 1–8 of FIG. 3. The NPD 302 includes one or more management agents (MA) 402 that each collect and report certain types of management information of a NPD 302 to a Consolidated State Table (CST) 404. It is noted that a different CST 404 is provided for each subnet to which the NPD 302 is coupled or participating. Each CST 404 includes an entry for each NPD 302 in a given group including an entry for its own management information. Each management agent 402 may include, for example, instrumentation code and a management communication layer (not shown). The management communication layer is responsible for understanding a management protocol, such as any one of the traditional protocols including SNMP, DMI, etc., or any other management protocol including HTTP-based communication as described herein. The management communication layer calls the instrumentation code to acquire data or to perform management control operations. The function and implementation of instrumentation code varies widely depending the hardware and software environment and on the level of management data. Several levels of management data are described in Table 1 above, including, but not limited to, hardware, the operating system (OS), software applications, etc.

As an example of acquiring hardware management data, a hardware management agent 402 includes instrumentation code that is used to execute input and output instructions in order to acquire information that describes the physical memory modules installed on a system board of a computer system. As an example of acquiring operating system management data, an OS management agent 402 includes instrumentation code that is used to execute instructions to access Windows NT's perfmon (performance monitor) counters to determine how many interrupts per second are being serviced by a CPU. Another role performed by instrumentation code of a management agent 402 is to execute control operations to effect management operations. An example of a control operation is to reboot a system or terminate a failed process. Although the management agents 402 may be implemented as code modules comprising software in a given implementation, the present invention is not limited to any particular implementation of management data collection system, and may comprise hardware, firmware, software, or any combination thereof.

Two subnets 410, 411, each representing any subnet of the network 300 to which the NPD 302 is coupled, are further coupled to communication logic 412 of the NPD 302. Two subnets 410, 411 are shown to illustrate that each NPD 302 may be coupled to one or more subnets in a network, such as the NPD 1 coupled to the subnets 304 and 306 of the network 300. The communication logic 412 may be implemented according to any desired network standard, architecture or protocol. The communication logic 412 may be implemented according to TCP/IP, for example, and thus comprises a TCP/IP protocol stack for sending and receiving Internet packets according to HTTP or the like. A monitor module 414, a registration module 416, a beacon module 418 and a forward/master module 420 are each coupled to the communication logic 412. Each of the modules 414, 416, 418 and 420 may be implemented in any desired manner, such as in hardware, firmware, software or any combination thereof, where it is understood that the present invention is not limited to implementation particulars. Each module includes the appropriate logic for implementing the desired functions as further described below.

The monitor module 414 provides management information from other NPDs 302 of a group to the CST 404, such as any of the groups 320, 322 or 324. The monitor module 414 also detects registration beacon packets, or type 6 packets, and builds or otherwise adds appropriate entries to a corresponding management server table (MST) 405 that includes an entry for each registered management server. It is noted that a different MST 405 is provided for each subnet to which the NPD 302 is coupled or participating. The registration module 416 retrieves registration packets from one or more management servers, such as either of the management servers 102, 314, sent via any coupled subnet, such as either of the subnets 410, 411, and adds entries to the one or more MSTs 405, each including an entry for each registered management server for each group. The registration module 416 then sends a type 6 registration beacon packet on the corresponding subnet to inform the other NPDs of group of the server information. The beacon module 418 retrieves local status information of the local NPD 302 from the CST 404 for assertion on either of the subnets 410, 411 via the communication logic 412. If the local NPD 302 serves as an ASC group master of its group, the forward/master module 420 forwards the consolidated status information from all of the NPDs 302 in its group from the appropriate CST 404 to the management server 102 via the appropriate subnet 410 or 411 and the communication logic 412, as described further below.

The beacon module 418 of each NPD 302 periodically sends broadcast packets to all other NPDs 302 on the same subnet using an appropriate protocol, such as UDP or the like. As described previously, each of the broadcast packets are filtered by the routers 312 and not sent to other subnets. Each broadcast packet is formulated as an ASC beacon packet, where there are six different types of ASC beacon packets (1–6). The following Table 2 summarizes the different types of ASC beacon packets:

TABLE 2

Types of ASC Beacon Packets

| Packet Type | Description |
|---|---|
| 1 | NPD 302 can serve as the ASC Group Master |
| 2 | NPD 302 cannot serve as the ASC Group Master and only broadcasts its own state information |
| 3 | Same as Type 1 but includes NPDNAME |
| 4 | Same as Type 2 but includes NPDNAME |
| 5 | Includes NPDNAME and indicates request to send beacon packet that includes the NPDNAME on next beacon broadcast |
| 6 | Only contains address and port number of a management server |

The packet types 1 and 3 are sent by a NPD 302 that may also serve as an ASC group master, where the packet type 3 is similar to type 1 but includes a NPDNAME variable. The packet types 2 and 4 are similar to types 1 and 3, respectively, except that the corresponding NPD 302 does not serve as an ASC group master. A NPD 302 would not serve as group master for various reasons, such as, for example, its processing capabilities would be exceeded if it attempted to be group master.

The first two types of ASC beacon packet (types 1–2) are normal packets and are the packet types most commonly sent, are each structured as follows:

```
struct ASCBeaconpacket
{
    unsigned long Type;      // Packet Type
    unsigned long Time;      // time of last state change at NPD
    unsigned long Interval;  // broadcast interval in seconds
    char NPDID[32];          // NPD identifier
};
```

where the TYPE variable identifies the packet type and format as described in Table 2. The TYPE field is set to a value of 1 if the corresponding NPD is able to serve as ASC group master, but otherwise the TYPE field is set to 2. The TIME variable is set by a NPD 302 to the time of its last state change (LSC). The last state change time is when the NPD 302 experienced a status change that would be of interest to a management application of a management server, such as either or both of the management servers 102, 314. For example, if a NPD experienced a state change from a normal to a degraded state, the time at which the event occurred would be its new LSC time. The INTERVAL variable is used to inform the other NPDs 302 in the same group how often its packets are to be sent during its normal operation, which is used to detect when a NPD is no longer actively sending ASC beacon packets. A default value for the INTERVAL variable is 60 seconds or one (1) minute. The NPDID variable is an identifier that uniquely identifies the NPD 302 in a group, and generally comprises a Universal Unique Identifier (UUID). The UUID is normally assigned when the management software component is installed in the NPD 302.

The next two types 3–4 of ASC beacon packets are similar to types 1–2, respectively, except that they include an additional NPDNAME field as follows:

```
struct ASCBeaconPacket
{
    unsigned long TYPE;      // Packet Type
    unsigned long Time;      // time of last state change at NPD
    unsigned long Interval;  // broadcast interval in seconds
    char NPDID[32];          // NPD identifier
    char NPDName[64];        // NPDNAME as assigned by operating
                             system
};
```

where an example of a NPDNAME is the UNC server name used in Microsoft Windows® networks. Type 3 or 4 packets with the NPDNAME field are only sent when needed to identify the name of a NPD 302. Otherwise, the smaller type 1 or 2 packets are sent to reduce packet size and traffic on the network. A type 5 packet is identical to packet types 3 and 4 and is sent by the ASC group master to request that each NPD 302 in the group send a subsequent packet including its NPDNAME. Each NPD 302 responding to a type 5 packet sends either type 3 or 4 rather than the normal types 1 or 2, respectively.

The type 6 ASC beacon packet, or registration beacon packet, is sent by the registration module 416 of a NPD 302 that has received registration information from a management server, such as the management server 102. The structure of the type 6 packet is as follows:

```
struct ASCBeaconpacket
{
    unsigned long Type;                  // Packet Type
    unsigned long ManagementServer;      // IP address
    char MgtServerName [64];             // Server Name
    int PortNo;                          // port number
};
```

where the MANAGEMENTSERVER variable identifies the IP address of a management server that has registered with the NPD 302, the MGTSERVERNAME variable provides a server name and the PORTNO variable is the port number to be used to contact the management server. The type 6 packet is broadcast to the other NPDs 302 in the group to provide information for contacting the management server associated therewith in the event that any of the NPDs serve as master.

Figure 5:
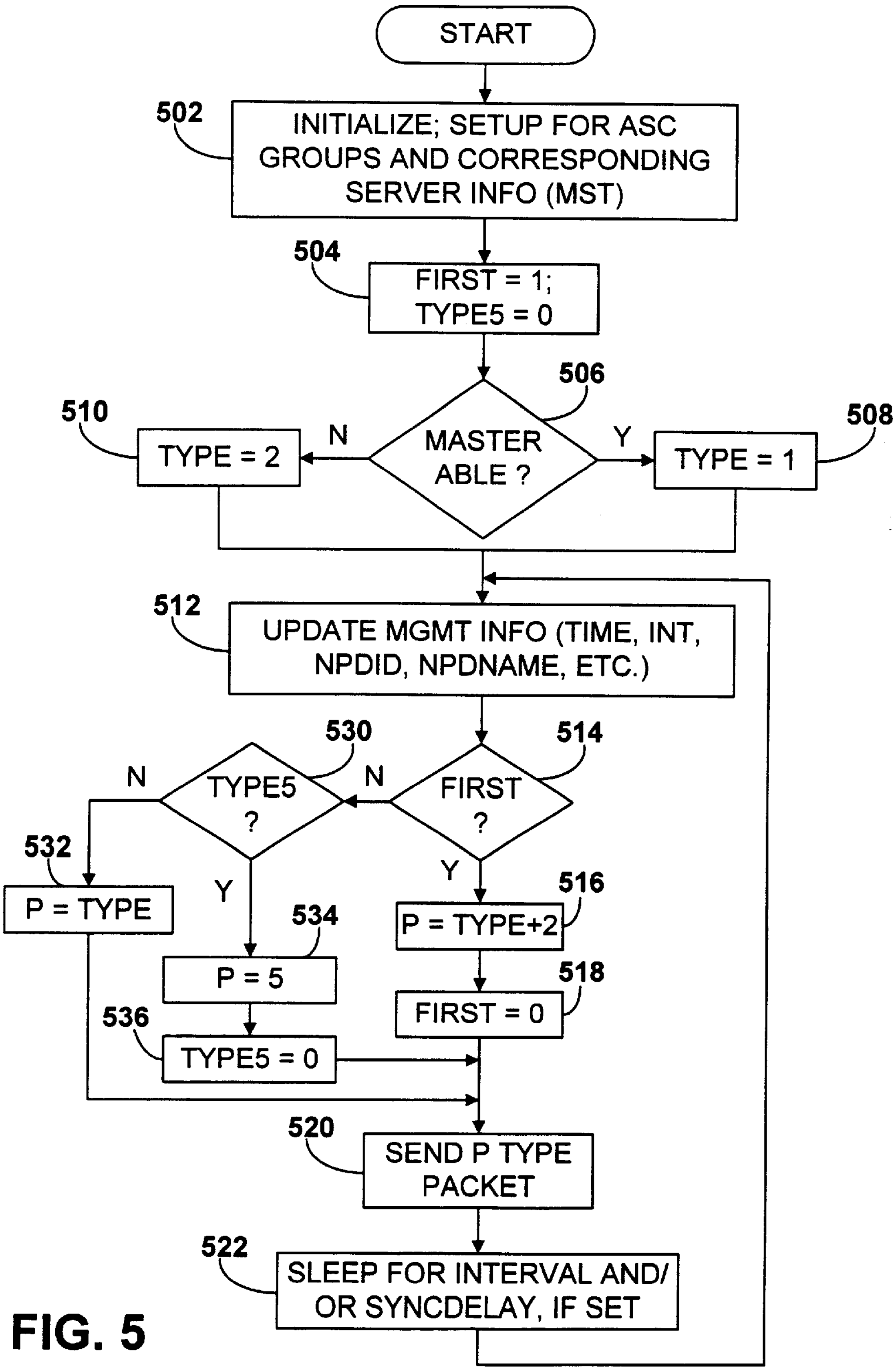
FIG. 5 is a flowchart diagram illustrating the general operation of a beacon module of the NPD of FIG. 4.

Referring now to FIG. 5, a flowchart diagram is shown illustrating the general operation of the beacon module 418. The primary function of the beacon module 418 is to send an ASC beacon packet for the corresponding NPD 302 at a timing interval specified by the INTERVAL variable. The beacon packets are broadcast to the other NPDs on the same subnet as previously described. If the NPD 302 does not change state, the contents of the beacon packet do not change. Receipt of the packets at the predicted time interval implies continued operation of the NPD. If several intervals pass without reception of a packet from a particular NPD 302 in a group, then the NPD 302 is considered Off Line or inactive and no longer part of the group.

The NPD 302 performs initialization and sets up one or more groups and corresponding server information as indicated by block 502. Recall that each NPD 302 may include one or more addresses and thus may belong to one or more different groups. Also, if the NPD 302 is part of multiple groups, each group may be served by one or more different management servers. The management server tables or MST 405, where each table is individually referred to as MGTSRVTAB[ ], are setup and initialized to include an address, name and port number for each management server and for each group to which the NPD 302 belongs. The beacon functions are performed for each group, although the logic associated with only one is shown and described in the flowchart for purposes of clarity. At next block 504, a FIRST flag is set to 1 indicating a first beacon packet and a TYPE5 flag is initially set to zero. The TYPE5 flag is set by the forward/master module 420 if it determines that it is ASC group master and that a NPDNAME of another NPD 302 in the same group is missing. It is noted that a different TYPE5 flag is provided for each subnet to which the NPD 302 is coupled or participating. At next decision block 506, the configuration of the NPD 302 is examined to determine whether the NPD 302 may serve as ASC group master. The mastership determination may be based, for example, on whether the device is able to handle the extra processing associated with being master. If it can server as a master, the TYPE variable is set to one (1) at a block 508 to indicate that the NPD 302 may serve as ASC group master. Otherwise, the TYPE variable is set to two (2) (non-master type) to indicate that the NPD 302 may not serve as ASC group master.

From either blocks 508 or 510, operation proceeds to block 512 where the management information in the CST 404 for the local NPD 302 is updated by the beacon module 418 using information from the one or more management agents 402. The management information includes the TIME, INTERVAL, NPDID and NPDNAME, among other information as desired. Operation then proceeds to decision block 514 to determine whether the first ASC beacon packet is to be sent. In the first iteration after initialization, the FIRST flag was previously set indicating the first ASC beacon packet, so operation proceeds to block 516. At block 516, a variable P is set to TYPE +2, so that the first packet is either type 3 or type 4 and includes the NPDNAME in the packet. In general, the first packet sent by the beacon module 418 for each NPD 302 includes the NPDNAME. Subsequent packets generally do not include the NPDNAME unless sent in response to a type 5 packet.

At next block 518, the FIRST flag is cleared or set to zero (0) so that subsequent packets are no longer considered the first packet. Operation then proceeds to block 520, where the beacon module 418 sends a packet of type P, which is either a type 3 or 4 packet. Operation then proceeds to block 522, where the beacon module 418 sleeps for an period of time specified by the INTERVAL variable, which has a default of 60 seconds. After the INTERVAL period of time has elapsed, the beacon module 418 re-awakens and operation loops back to block 512 to repeat the process.

After the first ASC beacon packet is sent and the FIRST flag is cleared, operation proceeds from decision block 514 to block 530 in subsequent iterations. At block 530, the TYPE5 flag is queried to determine whether to send a type 5 packet. As described further below, the forward/master module 420 determines if a NPDNAME of one or more NPDs 302 of its group is missing from the CST 404 and determines that a type 5 packet should be sent. The other NPDs 302 respond with packets including their NPDNAME. If the TYPE5 flag is zero or cleared, then operation proceeds to block 532 where the P variable is set equal to the value of the TYPE variable previously set, indicating a type 1 or 2 packet without the NPDNAME. From block 532, operation returns to block 520 to send a packet of type 1 or 2 without the NPDNAME. Otherwise, if the TYPE5 flag has been previously set as determined at block 530, then operation proceeds to block 534, where the P variable is set to 5 to indicate a type 5 packet. Operation then proceeds to block 536 where the TYPE5 flag is cleared once again. It is noted that since packets including NPDNAMEs are larger then normal packets, it is desired to send as few as possible. From block 536, operation proceeds to block 520 where a type 5 ASC beacon packet is sent on the appropriate subnet to request NPDNAMEs from the other NPDs 302 of the same group.

It is noted that if every device of a group has the same beacon sleep interval and if all are reset or initialized at the same time, which may often be the case, that an undesirable situation may result in which all the devices are attempting to send beacon packets at the same time. It is desired to spread out the beacon packets in the interval by inserting a different delay offset for each NPD 302 in the group. In particular, the sleep interval period is modified any time the monitor module 414 detects a beacon packet from a new NPD 302 in the group, and is modified based on the value of the lower 8 bits of IP address of the local NPD 302. In this manner, since every other NPD 302 in the group receives the new beacon packet at the same time and since every NPD 302 has a different IP address, each interval is modified by a different amount to achieve the desired spreading effect.

As described more fully below, if the monitor module 414 detects a beacon packet from a new NPD 302, it executes a DELAYNEXTBEACONPACKET routine that sets a SYNCDELAY value to the lower 8-bit IP address value modulo INTERVAL. For example, if the lower 8-bit IP address value is 132 and the INTERVAL variable is 60, then the SYNCDELAY value is set to modulo 60(132)=remainder of 132/60=12. If the SYNCDELAY value is modified to other than zero and if the beacon module 418 is currently sleeping for the INTERVAL period, the remaining sleep period is set to SYNCDELAY by the monitor module 414. If the beacon module 418 is not sleeping and the SYNCDELAY value is other than zero, then the beacon module 418 sets its sleep period to SYNCDELAY rather than INTERVAL. The beacon module 418 then resets the SYNCDELAY value to zero in either event. If the SYNCDELAY value is zero, then the beacon module 418 is otherwise not affected and sleeps for the regular INTERVAL period.

The following pseudo code exemplifies the functions of an exemplary beacon module 418 of an exemplary NPD 302, where it is understood that many variations are possible depending upon the desired capabilities and implementation:

```
// some data structures
struct ASCipaddr[25];   // group IP addresses of those ASC groups to which the NPD belongs
int groups;             // number of ASC groups to which the NPD belongs
// array of management server IP addresses and associated port number and the ASCgroup that
// is associated with that management server. Note that the ASC group is specified by the IP
// address of this NPD. (Note: the top 24 bits of the IP address identify the ASC group.)
struct msip
{unsigned long ManagementServer|Paddress;
char MgtSvrName[64];   // name of the management server
unsigned long ASCgroup;
};
typedef msip MgtSvrTab[20];
// number of entries in management server table MgtSvrTab[ ]
int RegisteredMSCount;
Initialization:
{Examine configuration info to determine if we will serve as ASC Group master
}
    FirstTime=1; // FIRST time flag is used to force sending NPDNAME packet
    If (we will serve as ASC Group Master)
        Type=1;
    Else
        Type=2;
// build a table that has all of the ASC Groups to which we belong including an entry for each
IP
// address that is assigned to this NPD
for (I=O to all IP addresses assigned to this NPD)
    ASCipaddr[I]=address;
// set groups variable-how many ASC groups we belong to
     groups=number of entries in ASCipaddr array;
// initialize count of mgt servers
    RegisteredMSCount=0;
// Set beacon transmit interval (in seconds)
    interval=60;
// initialize the TYPE5 flag that controls sending the NPDNAME interrogation message
    SendType5Packet=0;
// Main loop, execute until system terminates
    While (system active)
{
// transmit the beacon packet for each network adapter (NIC)/IP address combination
    For (i=1,i<=NIC,i++)
    // Get time of last system state change from our local management agent
        Time=GetLastStateChangeTime( );
    // Get our UUID
        NPDID=NPD UUID;
    // modify the Type field if we are sending the NPDNAME
    if (FirstTime==1)
    {Set beacon packet Type field to a value of Type+2;
    FirstTime=0
    }
    else
    // not first time, check Type5 flag
    if (SendType5Packet ==1)
    {SendTypesPacket=0;
    Set beacon packet Type to 5; // ask for device names
    }
    }
    // See if the SyncDelay flag was set since exiting the delay code
    if (SyncDelay>0)
    {Sleep(SyncDelay);
    SyncDelay=0; // reset the flag
    }
    // transmit our beacon packet
        if (Type is 3 or 4 or 5, include the NPDName field with this NPD's name in it;
        SendUDPBroadcast packet (ASCStatusPacket,target port MP)
```

-continued

```
    }
// Sleep for Interval seconds and reset SyncDelay flag if it was set
      Sleep(Interval);
      SyncDelay=0;
}
```

Figure 6:
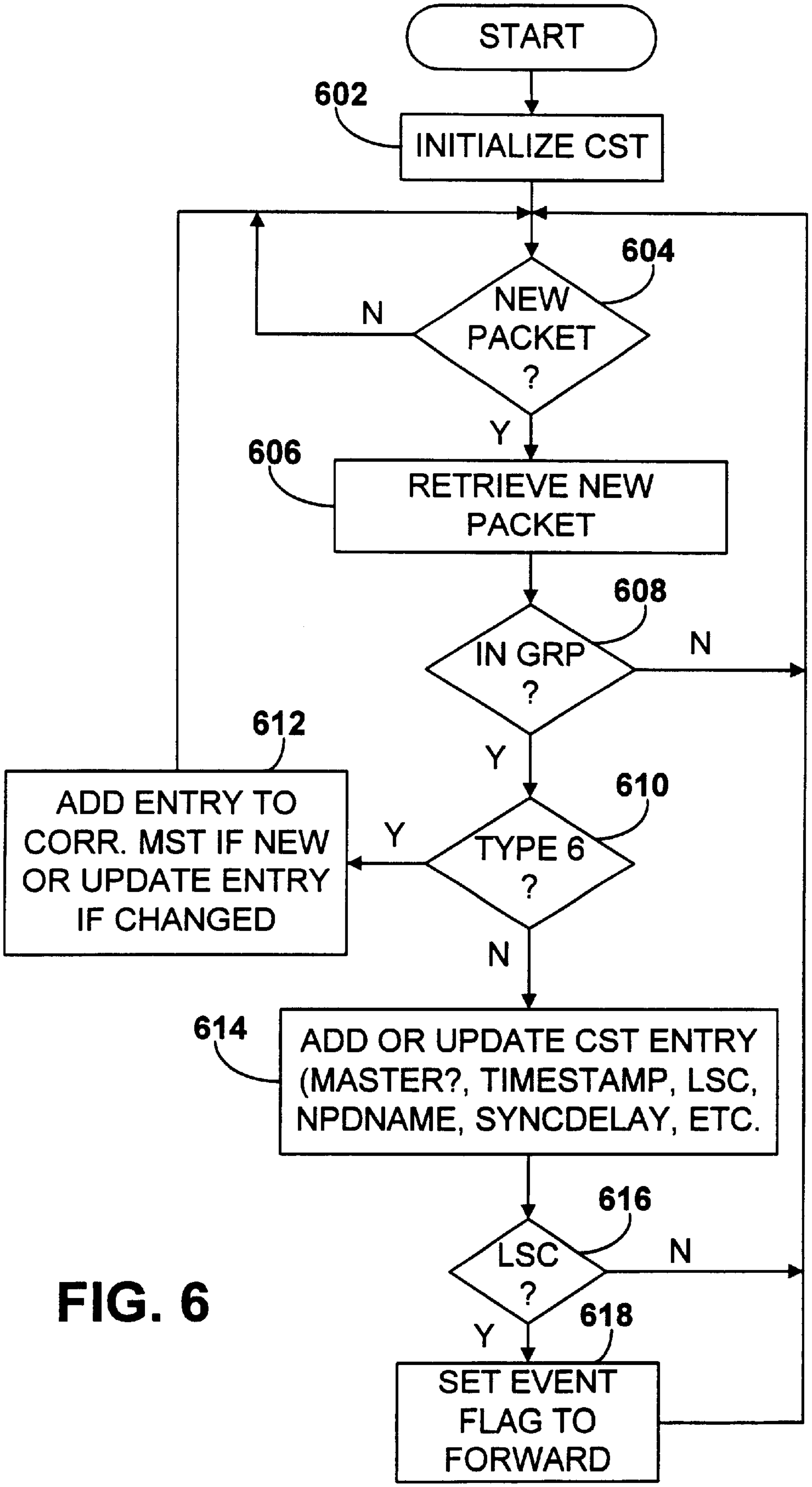
FIG. 6 is a flowchart diagram illustrating the general operation of a monitor module of the NPD of FIG. 4.

Referring now to FIG. 6, a flowchart diagram is shown illustrating the general operation of the monitor module 414. The primary function of the monitor module 414 is to process ASC beacon packets that have been received as broadcast packets directed to port MP on the NPD 302. The ASC Monitor module 414 is responsible for building the CST 404 data structure that contains state information for all members of the group to which the NPD belongs. Additionally, the monitor module 414 determines whether any state changes have occurred in any entries of the CST 404 and sets an EVENT flag. It is noted that a different EVENT flag is provided for each subnet to which the NPD 302 is coupled or participating. The forward/master module 420 uses the EVENT flag to determine whether to forward consolidated status information to a corresponding management server such as the management server 102.

At a first block 602, the CST 404 is setup and initialized. It is noted that the management agents 402 may be implemented to enter management information directly into the corresponding local entry for the local NPD 302, or the monitor module 414 may include logic to retrieve the applicable information from the management agents 402 and enter the information into the CST 404. At next block 604, the monitor module 414 enters a loop in which the subnet 410 (and/or the subnet 411 ) via the communication logic 412 is continuously or periodically monitored for reception of a new ASC beacon packet. When a new packet is detected, operation proceeds to next block 606 where the packet is retrieved. At next decision block 608, it is determined whether the packet is from another NPD 302 in the same group. For example, an IP address of the packet retrieved at block 606 may be examined to determine if the upper 24 bits are the same as the IP address of the local NPD 302. If the packet is not from a NPD 302 in the same group, the packet is discarded or ignored and operation returns to block 604 to monitor for a next packet.

If it is determined at block 608 that a received ASC beacon packet is from a NPD 302 in the same group, operation proceeds to next decision block 610, where the TYPE variable of the packet is examined to determine if the packet is a type 6 packet. If so, then the packet is from another NPD 302 broadcasting the information of the management server responsible for the group of NPDs, and operation proceeds to block 612. At block 612, the information from the type 6 packet, including, for example, an IP address and port number from a management server, is formulated into an entry in a corresponding management server table or MST 405. If the entry already exists, the information is entered if different from that already in the management table. From block 612, operation proceeds back to block 604 to monitor for another packet.

If it is determined at block 610 that the ASC beacon packet is not type 6, then the packet is of type 1–5 and operation proceeds to next block 614. At block 614, an entry is added into the CST 404 if an entry corresponding to the sending NPD 302 does not already exist or an existing entry is updated with the information from the packet in the CST 404. If an entry has not previously been entered for the NPD 302, the SYNCDELAY value is set as previously described based on the IP address. Each entry in the CST 404 may have any desirable form or structure. The following CST table entry is exemplary for purposes of illustration:

```
struct ConsolidatedStateTableEntry
    {
    unsigned long LastStateChangeTime;  // The time when this NPD
                                        last had a state change
    unsigned long CState:               // State of the NPD 1=normal,
                                        2=off-line,
    3=unknown
    char NPDID[32];                     // NPD identifier - UUID
    unsigned long TimeLastPacket;       // time that a beacon packet
                                        was last received NPD
    unsigned long Interval;             // broadcast interval for this
                                        NPD
    int CanServeAsMaster;               // indicates if the NPD has
                                        been configured to serve
                               as
                                        // the ASC Group Master
                                        (1=yes, 2=no)
    }
```

where the variable LASTSTATECHANGETIME is used to compare with the TIME variable from the packet to determine if there has been a state change, the variable CSTATE is used to determine the status of the corresponding NPD 302, NPDID is the identifier of the sending NPD 302 as previously described, the variable TIMELASTPACKET indicates the elapsed time from the last packet received from the sending NPD 302, INTERVAL is the expected time interval between beacon packets from the sending NPD 302 as previously described, and the variable CANSERVEASMASTER is derived from the TYPE variable of the packet to indicate whether the sending NPD 302 is able to serve as the ASC group master.

The CSTATE variable indicates the state of the other NPDs 302 in the same group as being Normal=1, Off Line=2, or Unknown=3. The CSTATE variable is initially set to Unkown or 3. If another NPD 302 continually sends packets according to its specified INTERVAL period, then the state of the NPD 302 is considered Normal=1. If another NPD 302 has previously sent one or more packets and then several INTERVAL periods have elapsed without having received a packet from that NPD 302 (as determined using the TimeLastPacket variable), then its state is considered Off Line=2.

At next decision block 616, the LSC or last state change variable is examined to determine whether the sending NPD 302 has had a state change. If not, operation returns to block 604 to monitor for another packet. If the state of the sending NPD 302 has changed, then operation proceeds to block 618 where the EVENT flag is set to indicate that the contents of the CST 404 should be forwarded to the management server of the subject group. It is noted that each NPD 302 includes a single EVENT flag for each group to which it belongs, so that any ASC beacon packet that indicates a change of state causes the EVENT flag of that group to be set. Operation then returns to block 604 to monitor for a next ASC beacon packet. Operation continuously loops in this manner so that the monitor module 414 of each NPD 302 keeps its local CST 404 updated with the most recent status and management information of every other NPD 302 in the same group. Also, each active NPD 302 in each group maintains the same or a similar CST 404 with the same status and management information of all members of the same group.

As described further below, any active NPD 302 of each group that determines that it is able to perform as ASC group master is able to become the master or take over as master if necessary and forward the contents of its CST 404 to the appropriate management server. However only one of the NPDs 302 in a given group is intended to be ASC group master at any given time, and the ASC group master is usually the only one that forwards the CST 404 to the management server. Nonetheless, each NPD 302 makes an independent determination of ASC group master so that even if based on the same criterion, it is possible that several NPDs 302 may temporarily determine themselves to be master at the same time. Simultaneous masters may occur upon initialization of a network or a subnet or if a current group master suddenly drops out or goes off line. A situation of simultaneous masters is relatively inconsequential since the management server is able to distinguish between each of the NPDs 302 that forward information and identify the true master. Also, the "false" masters eventually determine that they are not the current master by analyzing ASC beacon packets from the true master and drop out quickly, which is desirable since efficiency is lost if more than one NPD 302 is forwarding the same information to the same management server.

The following pseudo code exemplifies the functions of an exemplary monitor module 414 of an exemplary NPD 302 including a DELAYNEXTBEACONPACKET routine, where it is understood that many variations are possible depending upon the desired capabilities and implementation:

```
ConsolidatedStateTableEntry CST[256,NIC]; //Note: there are as many columns in the CST table as
// there are NIC/IP address pairs. There are 256 entries that represent the possible members of an
ASC
// group.
    // Initialize CST
    Set all entries of CST to zero; Set all CState values to 3 (unknown)
    While (system active) // keep on executing until the system is shutdown
    {
    // Wait for a beacon packet to arrive
    NewPacket=GetUDPPacket(port MP);
    // Process new packet
    // Determine if this beacon packet is from an ASC Group to which local NPD belongs by
getting
    // the high order 24 bits of the IP address
    ADDR=(IP address of beacon packet sender) & 0FFFFFFh;
    // Does ADDR match the high order 24 bits of any of our IP addresses?
    If (ADDR == high order 24 bits of one of our IP addresses)
        // process this beacon packet and update the proper CST entry
        // extract lower 8 bits of IP address and use as index into the CST table
        node=(IP address of beacon packet sender) & 0FFh;
        // note, the CST column is selected by the NIC/IP address pair that matched ADDR
from
        // the beacon packet
        // Check to see if this is a NPD from whom we have not previously received any
    beacon
        // packet, i.e., a new NPD in our group. If so, call the routine that will change when
    the
        // next beacon packet will be sent
        if (CST[note,NIC].Cstate==3) DelayNextBeaconPacket( );
        // Mark CState as normal
        if (CState !=1) event=1; // the NPD state has changed, cause state forwarding to
occur
        CState=1;
        // Update all fields in the CST with applicable info
        if(Type==1 || Type==3)
            CST[node,NIC].CanServeAsMaster=1;
            Else
            CST[node,NIC].CanServeAsMaster=2;
        // capture the NPDNAME if packet is type 3-5
        if (Type==3||Type==4||Type==5) CST[node,NIC].NPDName=NPDName;
        // set the time of receipt of this packet
        CST[node,NIC].TimeLastPacket=current time;
        // if NOT type 6 check to see if he has had a state change since last time
        if ((Type==6)
        {// capture management server address info
        if (new management server address)
        {
        add new entry to MgtSvrTab table -- mgt server IP address, MgtServerName, and
        port and this ASC group's IP address
        Wait until ForwardActive flag is set to zero and then cancel the sleep delay timer in
        the ASC Forwarding logic.
        // This will force execution of the forwarding logic to make potential use of this new
        // address
        Event=1;
```

-continued

```
        }
        }
        else
        {
        if (NetPacket.LastStateChangeTime != CST[Node.NIC].LastStateChangeTime)
            {
            // Set event flag to force forwarding of state info to management server
            event=1;
            CST[Node,NIC].LastStateChangeTime=NetPacket.LastStateChangeTime;
            }
        }
        }// end while loop
// routine to delay sending the next beacon packet
void DelayNextBeaconPacket( )
{// set the variable SyncDelay to change the time at which the next beacon packet will be sent
SyncDelay=(lower 8 bits of our IP address) modulo 60; // produces a value in the range 0 through 59
// check to see if the ASC Beacon logic thread is sleeping
if (Beacon thread is sleeping in "delay code")
    {Reset the beacon thread delay value to SyncDelay} // This will change how long the thread
    sleeps
    // if the thread was not sleeping, the beacon thread will check the SyncDelay value and delay
Return;
}
```

Figure 7:
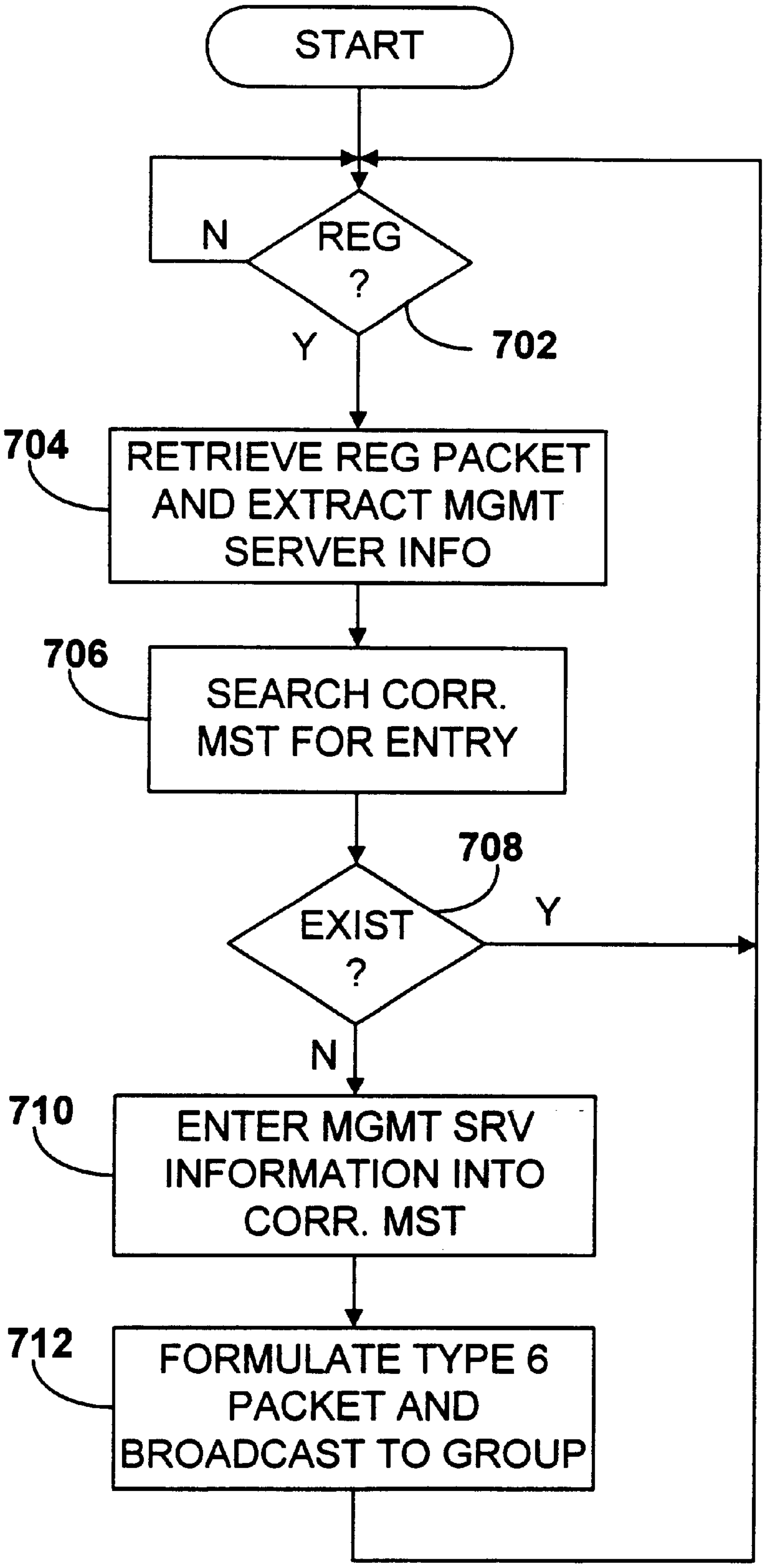
FIG. 7 is a flowchart diagram illustrating the general operation of a registration module of the NPD of FIG. 4.

Referring now to FIG. 7, a flowchart diagram is shown illustrating the general operation of the registration module 416. The registration module 416 acquires the address of a management server that is the target for forwarding the consolidated state information from the CST 404. In general, a management server, such as either or both of the management servers 102 or 314, performs initial discovery operations, such as explicit discovery, IP pinging, router tables, etc., to identify one or more NPDs 302 of one or more subnets to manage. In this manner, the management server determines the address of at least one NPD 302 of each subnet that it will manage. It is noted that once any particular NPD 302 of each group that a management server intends to manage is identified, automatic state consolidation according to the present invention substantially reduces or eliminates the need for further polling or pinging to monitor the managed devices since a group master periodically updates the management server as described herein.

Once a NPD 302 is identified, the management server registers with that NPD 302 by sending its information via a registration packet, where the registration packet includes a target address of the NPD 302 and the address, name (MGTSVRNAME) and port number (MSPORTNO) of the management server. In one embodiment, the management server sends an HTTP post transaction that includes a payload with the address of the NPD 302, the port number to be used in contacting the management server, and the name of the management server. It is noted that the selected NPD 302 need not be an ASC master of the targeted group, and that any member of the targeted group suffices. Since the NPD 302 may belong to multiple groups, the target address included in the registration packet is the IP address to which this HTTP POST was addressed and thus identifies the appropriate one of the ASC groups that the management server wishes to target. This enables the registration module 416 to determine the appropriate group from which the registering management server wishes to receive consolidated state information. The management server port number or MSPORTNO is the TCP port number that should be used when forwarding information to this particular management server.

In FIG. 7, the registration module 416 waits to receive a registration packet from a management server at a first decision block 702 and continues to loop at block 702 until a registration packet is received. When a registration packet is received, operation proceeds to block 704, where the management server information is extracted from the registration packet. The target address identifies a particular group, such as, for example, the high order 24 bits of an IP address, and also identifies a corresponding management server table MST 405 for that group. At next block 706, the corresponding MST 405 is searched to determine if an entry already exists for the registering management server. If an entry already exists, as determined at next decision block 708, operation returns to block 702 to receive another registration packet, if any. If an entry does not exist in the appropriate management server table for the registering management server, operation proceeds to block 710, where the management server information is entered into the appropriate MST 405. Operation then proceeds to next block 712, where the registration module 416 formulates a type 6 packet and broadcasts the type 6 packet onto the appropriate subnet, such as the subnet 410, via the communication logic 412. In this manner, the type 6 packet is broadcast to the appropriate group, so that all members of the group that receive the type 6 packet learn the address and port number of the appropriate management server, regardless of whether the sending NPD 302 is the ASC group master. Operation then returns to block 702 from block 712 to monitor for another registration packet, if any.

The following pseudo code exemplifies the functions of an exemplary registration module 416 of an exemplary NPD 302, where it is understood that many variations are possible depending upon the desired capabilities and implementation:

```
While (system active)
{
// wait for HTTP POST
HTTPtransaction=WaitForHTTPPOST( ):
// POST received, see which IP address it was addressed to and which ASC group
targIP=contents of POST;
MgtSvrName=contents of POST;
// get the mgt srv IP address of the appropriate ASC group
MgtSvrAddr=get address from TCP connection
// See if this mgtsvr is already in the mgt srv tab[ ], if not update the table
Search MgtSvrTab to see if this management server address and associated target IP address is in
table
If not, add the management server IP address and its port number and the IP address of this ASC
Group as specified by targIP, the IP address in the HTTP POST body to the table and increment
the
RegisteredMScount variable;
if (MgtSvr not in table)
{// if mgt svr not in table, we need to send a beacon packet with this new address in it.
// In this way, knowledge of the mgt svr will propagate to the ASC group without delay
    set Type=6
    put address, management server name, and port number of new management server in type
6 beacon packet and send the packet immediately
    // a UDP broadcast
}
}
```

Figure 8:
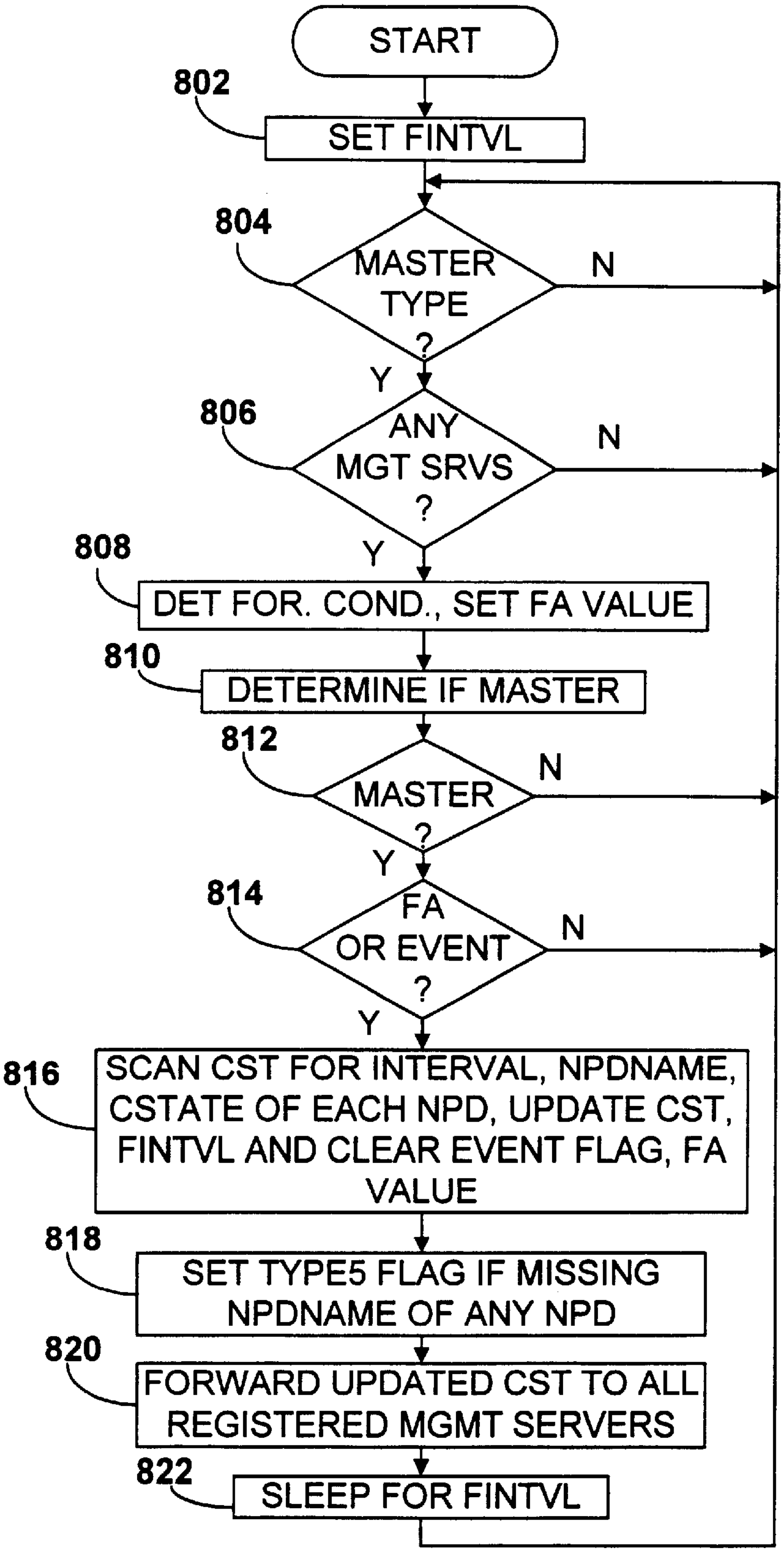
FIG. 8 is a flowchart diagram illustrating the general operation of a forward/master module of the NPD of FIG. 4.

Referring now to FIG. 8, a flowchart diagram is shown illustrating the general operation of the forward/master module 420. At a first block 802, an initial forward interval FINTVL is set that generally determines how often this NPD 302 may forward information to each registered management server if the NPD 302 serves as ASC group master. Actual frequency of forwarding the status information may be changed based on various factors discussed below. The initial value of FINTVL is preferably set to the local INTERVAL variable of the NPD 302. At next decision block 804, it is queried whether this NPD 302 may serve as ASC group master. Either of the local TYPE or CANSERVEASMASTER variables is evaluated to make this determination. If the NPD 302 can not serve as master, then the forward/master module 420 remains at block 804 and its operation is effectively completed unless there is a dynamic change in determination of mastership. In one embodiment, the configuration of the NPD 302 is only evaluated upon power-up, reset or initialization to determine whether that NPD 302 may serve as master. In that case, the NPD 302 must be reconfigured and reset to be able to serve as ASC group master. Alternatively, a NPD 302 may be implemented to continuously or periodically re-evaluate master capability based on the current configuration or dynamic reconfiguration. In the latter case, the TYPE and/or CANSERVEASMASTER variables may be dynamically updated during operation.

If the NPD 302 may serve as ASC group master as determined at block 804 for the subject group, operation proceeds to block 806 to examine the corresponding MST 405 to determine if any management servers have registered for this particular group. If not, then operation is effectively completed and no information is forwarded until at least one management server is identified. If a management server has registered as determined at block 806, then operation proceeds to next block 808 to determine conditions for setting a FORWARD-ACTIVE (FA) value. In one embodiment, the FA value is simply set like a flag so that information is forwarded to the management server(s) every FINTVL. Alternatively, the FA value may be used to define a multiple of FINTVL to reduce the frequency of forwarding information. For example, the FA value may be used to cause forwarding to occur at an average or mean value of the INTERVAL values of all NPDS 302 in the group. In any event, if the EVENT flag is set indicating that a change has occurred in the local status information or the external status information, the consolidated status information in the CST 404 is forwarded.

From block 808, operation proceeds to block 810 to perform a MASTERCHECK function to determine if the NPD 302 actually is the master of a given group. In one embodiment, the NPD 302 scans the entries in the CST 404 to determine whether it is master by determining if it has the lowest INTERVAL value of all NPDs 302 in the same group that are also active, such having their CSTATE variable set to 1 indicating normal operation, and having their CANSERVEASMASTER variables set to 1 indicating that they can serve as master. In other words, the NPD 302 in any given group that has the lowest INTERVAL VALUE, that is active and that has determined that it can serve as master, is the ASC group master for that group. In the event of a tie in which two or more NPDs 302 have the same lowest INTERVAL value, then the lowest order 8-bits of the respective IP addresses are examined to determine which is the lowest. Thus, the INTERVAL value determines which is master and the IP address operates as a tie-breaker. The use of the IP address as a tie breaker ensures that only one master is selected at any given time. Of course, the present invention is not limited to any particular method of identifying one device to serve as master. For example, a different value other than the INTERVAL value could be used, such as the IP address, or the highest address in a given group could be used as a tie breaker, etc.

In any event, it is desired that all NPDs 302 in a given group use the same criterion so that only one NPD 302 is ultimately selected at any given time. It is noted, however, that each NPD 302 is configured so that multiple NPDs 302 may have the ability to serve as master in any given group. Also, each NPD 302 that may serve as master continuously or periodically evaluates mastership and may take over at any given time. In this manner, mastership may be dynamically modified at any time. For example, if the current master fails or drops out for any reason, another NPD 302 determines that it is ASC group master and assumes master responsibilities of forwarding information to registered management servers. Also, if a new NPD 302 with capabilities to be master is powered up in a given group and has the lowest INTERVAL value, it will eventually take over as new master and the old master relinquishes master duties after recognizing the new NPD 302 as the ASC group master.

If the NPD 302 determines that it is not the master at next decision block 812, operation returns to block 804 to re-evaluate mastership as previously described. Operation remains in this loop until the NPD 302 is powered-down or pulled off line or otherwise determines that it is master. If the NPD 302 determines that it is the master at decision block 812, operation proceeds to block 814 to examine the EVENT flag and the FA value. In one embodiment, a CHECKNEEDFORUPDATE routine is provided to examine the EVENT flag and the FA value. If the EVENT flag has not been previously set indicating that no changes in status or management information has occurred for any of the NPDs 302 in a given group, and if the FA value is not set, then operation returns to block 804 to re-evaluate mastership as previously described. Operation remains in this loop until either of the EVENT flag or FA value indicates a need to forward information to the registered management server(s).

If and when, however, either of the EVENT flag or FA value indicate forwarding the consolidated status information as determined at block 814, then a FORWARDSTATEINFORMATION routine is executed to forward the contents of the CST 404 to one or more registered management servers in the corresponding MST 405. At block 816, the CST 404 is scanned and updated, if necessary. In particular, if any entry is "stale" indicating that the corresponding NPD 302 is off line or not responding, then the CSTATE value is updated to a value of 2 indicating the device is off line. Also, the INTERVAL variable of each entry is examined and the forward interval variable FINTVL is modified to the shortest reporting interval of all of the NPDs 302. In this manner, the shortest INTERVAL variable of the NPDs 302 of any given group determines the frequency at which the corresponding management servers are updated. Also, the EVENT flag and FA value are cleared to prevent forwarding duplicate information, where the EVENT flag is set again at a subsequent time by the monitor module 414 if the status or management information of any NPD 302 in the group changes.

Furthermore, if the NPDNAME of an existing entry in the CST 404 is NULL or empty, then the TYPE5 flag is set at next block 818 so that the NPD 302 sends a type 5 packet to the NPDs 302 that are members of the subject group as indicated. Recall that a type 5 packet causes each NPD 302 in the group to respond with an ASC beacon packet having its NPDNAME included. At next block 820, the contents of the updated CST 404 is sent to all registered management servers in the corresponding MST 405. In this manner, all of the management servers that have registered with any NPD 302 in a given group are updated with the most recent management and status information of that group. Operation then proceeds to next block 822 where the forward/master module 420 sleeps for an interval of time as determined by the forward interval variable FINTVL. When the forward/master module 420 subsequently awakens, it proceeds back to block 804 to re-evaluate its mastership as previously described.

In one embodiment, the ASC group master forwards the contents of the CST 404 in the form of an HTTP post transaction. The format of the HTTP post transaction for forwarding "n" device packets, each device packet corresponding to a NPD 302 in the group, is as follows:

POST/Forward HTTP/1.0<cr><In>
Accept: */*<cr><In>
Content-Length: ???<cr><In>
Content-Type: text/plain
<cr><In>
[Device Packet 0]
[Device Packet 1]
. . .
[Device Packet n−1]

where the first line specifies a forwarded post transaction, CONTENT-LENGTH specifies the length of the transaction, CONTENT-TYPE is a tag that defines the type of entity body such as, for example, plain text, and the carriage return, line feed pair (<cr><In>) following the content-type tag ends the HTTP header. The HTTP entity body or payload follows the header and comprises the remainder of the TCP message body. The tag may comprise an HTTP content-type tag, which may further be described using a Multipurpose Internet Mail Extension (MIME) descriptor. In this example, each device packet [Device Packet?], where ? varies from 0 to "n" minus one (n−1), is described as follows:

DeviceId=???<cr><In>
Time=Tue, DD MMM YYYY hh:mm:ss GMT<cr><In>
DeviceCondition=?<cr><In>
IPAddress=???.???.???.???<cr><In>
MasterForward=nn<cr><In>
DeviceName=?<cr><In> where DEVICEID denotes a Universal Unique Identifier (UUID) of the corresponding NPD 302, TIME denotes the time of the last status change on the MD 302 (DD MMM YYYY denotes day, month and year, respectively and hh:mm:ss denotes hour, minutes, seconds, respectively), DEVICECONDITION denotes CSTATE or the current condition of the NPD 302 (such as, for example, 1=Normal, 2=Off Line, 3=Unknown), IPADDRESS denotes the IP address of the NPD 302, MASTERFORWARD is only provided for the ASC group master of the group where "nn" denotes the forward interval FINTVL, and DEVICENAME denotes the device name for the corresponding NPD 302.

The forward interval FINTVL may correspond to a number of seconds between forwards of the consolidated state information to the management server. The reason for forwarding the consolidated information to the management server on a periodic basis is to remove a need for the management server to continuously or periodically poll any of the NPD's in any group. The MASTERFORWARD value tells the management server how often it should expect information from the ASC group master. If the information is not forthcoming, then the management server may take action, if desired, to poll the group members for specific management information as a failsafe measure. A more specific example of an HTTP post transaction is as follows:

POST/Forward HTTP/1.0<cr><In>
Accept: */*<cr><In>
Content-Length: NNN<cr><In>
Content_type: text/plain<cr><In><cr><In>
DeviceId=AAA<cr><In>
Time=Tue, 21 Jan 1998 08:21:32 GMT<cr><In>
DeviceCondition=1<cr><In>
IPAddress=256.256.256.1<cr><In>
MasterForward=60<cr><In>
DeviceName=COWHIDE<cr><In>
DeviceId=BBB<cr><In>
Time=Tue, 15 Jan 1998 11:21:32 GMT<cr><In>
DeviceCondition=1<cr><In>
IPAddress=256.256.256.2<cr><In>
DeviceName=TRISTAN<cr><In>
DeviceId=CCC<cr><In>

Time=Tue, 19 Jan 1998 02:21:32 GMT<cr><In>
DeviceCondition=2<cr><In>
IPAddress=256.256.256.3<cr><In>
DeviceName=CIRCUS<cr><In>
DeviceId=DDD<cr><In>
Time=Tue, 22 Jan 1998 09:21:32 GMT<cr><In>
DeviceCondition=1<cr><In>
IPAddress=256.256.256.4<cr><In>
DeviceName=WAGNER<cr><In>where the forward interval FINTVL is set to 60 seconds as determined from the ASC group master having a device identifier of AAA and having a device name of COWHIDE and where the NPD 302 having a device identifier of CCC and having a device name of CIRCUS is determined to be Off Line.

The following pseudo code including a main routine, an ASCMasterProcessing routine, a MasterCheck routine, a CheckNeedForUpdate routine and a ForwardStateInformation routine exemplifies the functions of an exemplary forward/master module 420 of an exemplary NPD 302, where it is understood that many variations are possible depending upon the desired capabilities and implementation:

```
// Initialization
ForwardInterval=Interval;
If (this NPD can server as ASC Group Master)
// If we cannot be a master, we cannot forward state info
While (system active)
(// check to see if there are any management servers registered to get forwarded information
if (any management servers registered in MgtSrvTab[ ])
{
// Call the routine that will perform the periodic processing required to perform selection of the ASC
// Master and to forward consolidated state information to the management server(s)
// set flag to indicate our state
ForwardActive=1;
//
ASCMasterProcessing ( );
}
ForwardActive=0;
// delay for next call
sleep(ForwardInterval);
}
ASCMasterProcessing ( )
{
// Determine if we are the Master
Master=MasterCheck( );
If (Master=TRUE) // We are the ASC Group Master
    // check to see if we need to forward state information
    if (CheckNeedForUpdate( )==TRUE)
        ForwardStateInformation( );
}
// Select ASC Group Master
Boolean MasterCheck( )
{
    rc=FALSE; // default return value
// extract the low order 8 bits of our IP address for this NIC
OurNode=IP Address of this NPD/NIC & 0FFx;
    If (CST[OurNode,NIC].CanServeAsMaster==1) // See if we can be the master
    {// scan CST table from first row up to the row indexed by OurNode index, search all entries
      // Note: This represents two nested loops: one index is row number by node index, 2nd
      // subscript is by NIC number
    // Compute elapsed time if this is a normal state NPD -- current master may have gone off-
line
    if (CState==1)
        {
        elapsed=curren_time-TimeLastPacket;
        ints=elapsed/CST[i,j].interval; //compute number of missed beacon packets
        if (ints>3) CST[i,j].CState=2; //change the state to off-line
        }
// Collect all entries that meet the following two conditions:
    // CState=1
    // CanServeAsMaster=1
// Select the master by sorting these entries with interval as the major sort key and the lower 8
// bits of the IP address as the minor sort key (This makes sure that the Master has the
// shortest interval). If two devices have the same interval, the one with the lowest 8-bit IP address is
// master
        rc=TRUE;
    }
    return rc
}
// Test to see if state information needs to be forwarded
Boolean CheckNeedForUpdate( )
{rc=FALSE; // default return code
if (event==1 | ForwardActive==1 a local event has occurred at this NPD)
    rc=TRUE;
return rc;
}
```

-continued

```
// ForwardStateInformation
void ForwardStateInformation( )
{// The purpose of this module is to forward the consolidated ASC Group state information to the
// management server.
// Additionally, the CST entries are scanned and a determination is made to see if NPDs that
previously
// had a value of CState that indicated “normal” have become “off-line”
// scan all table entries to determine if any have changed to an off-line state
// Additionally, determine which NPD has the shortest reporting interval. This shortest reporting
interval
// will drive the frequency with which we forward consolidated state information to the management
// server
    MinInterval=ForwardInterval;
    for(j=1 ,j<=NIC,j++)
    for(i=1 ,i<=256,i++)
    {// determine how long since we last heard from the NPD
    if (CST[i,j].CState != 3)
        {compute elapsed time
        elapsed=curren_time-TimeLastPacket;
        ints=elapsed/CST[i,j].interval; //compute number of missed beacon packets
        if (ints>3) CST[i,j].CState=2; //change his state to off-line
        // check to see if we have his device name
        if (NPDName == NULL)
        {// no NPDName, set flag such that we send an interrogation packet next time
        SendType5Packet=1
        If (CST[i,j].Interval<MinInterval)MinInterval=CST[i,j].Interval
        }
    }
    ForwardInterval=MinInterval;
// reset the event flag
    event=0;
// forward consolidated ASC state info to management server by use of an HTTP POST operation.
// Note that the data structure MgtSvrTab[ ]contains the addresses of the management servers that
have
// registered with this ASC group to receive consolidated state information. If more than one
// management server has registered, the consolidated state information is sent to all that have
// registered for this ASC Group. If none have registered, no information is sent.
}
```

Since any NPD 302 may have multiple IP addresses, it may participate in multiple logical groups. In one embodiment, each logical group includes up to 256 members (0–255) corresponding to the lower 8 bits of the IP address. However, each NPD 302 is uniquely identified by its UUID. This permits the management server 102 to discard duplicate information that might be received when a NPD 302 is a member of more than one ASC group due to the fact that it has multiple NICs and hence multiple IP addresses. For example, NPD 1 belongs to both groups 320 and 322 as shown in FIG. 3. If the management server 102 is managing both groups 320 and 322, then it receives duplicate information about NPD 1 from an ASC group master of both groups 320 and 322. The management server 102 is able to identify the duplicate information using the UUID of NPD 1 to discard duplicate entries.

In general, a network includes one or more network segments or subnets, a plurality of NPDs and at least one management server. Each NPD initializes, gathers its state information and sends an initial beacon packet on each subnet to which it is coupled. The beacon packets are preferably confined to the subnet and are not copied to other subnets. For each subnet, each NPD collects beacon packets sent by other NPDs on the same subnet and stores the status information into a local status database. For each subnet, each NPD periodically sends subsequent beacon packets with its status information so that all of the active NPDs have the most recent status information for all other NPDs of the same subnet. For each subnet, each NPD examines its configuration and determines whether it can serve as a group master. If a NPD can serve as master, it periodically determines whether it is ASC group master of each subnet to which it is coupled using the same criterion as the other NPD(s) on the same subnet to ensure a single master, so that one ASC group master is selected for each subnet. The ASC group master may send a query packet if it is missing certain information, such as a type 5 packet used to request device names.

Furthermore, each management server performs a discovery process and identifies at least one NPD of each subnet. The management server then sends a registration packet to the identified NPD to register with that NPD. The NPD receiving registration information from a management server sends a beacon packet with server information to the other NPDs of the same group. Thus, every NPD of each group is provided with the registration information for each management server that has registered with any NPD of that group. The ASC group master, also having the management server information, forwards the contents of its local status information to each registered management server on a periodic basis. The forward interval may be any sufficient period and may be set to the shortest beacon interval of the NPDs in a given group.

It is appreciated that each management server is periodically updated with all of the status information of each NPD of each subnet to which it registers. In this manner, the management server need not continuously poll to monitor the devices that it desires to manage. Since each NPD that can serve as master is provided with all the necessary status information to perform master functions, and since each NPD periodically determines whether it is master, a master will usually always be provided for each group or subnet. If a current master drops out, another master immediately, or shortly thereafter, assumes master responsibilities. The current ASC group master also informs each management server the interval it intends to forward status information. In this manner, the management server is able to determine if an ASC group master is not performing its functions and may poll the NPDs of the corresponding group as a failsafe measure.

It is now appreciated that automatic state consolidation for network participating devices according to the present invention provides a network management system with improved monitoring of devices attached to or otherwise participating in a network. Automatic state consolidation reduces network traffic related to management functions, such as monitoring, and enables device information to remain updated regardless of network changes. Automatic state consolidation provides updated information about devices upon initialization and periodically during operation, rather then requiring continued extraneous communication and/or polling that would otherwise consume valuable network bandwidth.

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended.

What is claimed is:

1. A device for coupling to a network subnet, comprising:

a management database that stores, relative to the device, local and external status information;

beacon logic that periodically sends beacon packets onto the network subnet, each beacon packet including the local status information from the management database;

monitor logic that stores external status information into the management database from beacon packets received from external devices sent via the network subnet; and forward logic that periodically determines if it is master, and if determined to be master, periodically forwards the local and external status information from the management database onto the network subnet while it is master.

2. The device of claim 1, further comprising:

a the local and external status information including a plurality of beacon intervals; and the forward logic determining if it is master based at least in part on comparisons of the plurality of beacon intervals.

3. The device of claim 2, further comprising:

the forward logic determining if it is master based at least in part on a beacon interval of the local status information compared with remaining beacon intervals of the external status information.

4. The device of claim 3, further comprising:

the local and external status information including a plurality of unique addresses; and the forward logic determining if it is master based further on a comparison of a unique address of the local status information compared with remaining unique addresses of the external status information.

5. The device of claim 1, further comprising:

communication logic, for coupling to the network subnet and coupled to the beacon logic, the monitor logic and the forward logic, that operates according to the HyperText Transfer Protocol (HTTP).

6. The device of claim 5, wherein the forward logic, while it is master, forwards the local and external status information via the communication logic to the at least one network subnet in the form of an HTTP post transaction including an entity body.

7. The device of claim 1, further comprising:

the forward logic, if it is master, forwarding the local and external status information from the management database to the network subnet if there is a change in the local and external status information.

8. The device of claim 1, further comprising:

at least one management agent that collects the local status information and that stores the local status information into the management database.

9. The device of claim 1, further comprising:

registration logic that stores server information from a server beacon packet received from the network subnet and that forwards the server information to the network subnet using a server beacon packet.

10. The network system of claim 1 further comprising registration logic that stores server information from a server beacon packet and that forwards the server information to the at least one subnetwork using a server beacon packet.

11. The network system of claim 1 further comprising:

the status information including a plurality of beacon intervals; and the forward logic determining if it is master based at least in part on comparisons of the plurality of beacon intervals.

12. A method of consolidating status information of a plurality of devices coupled to a first network subnet for sending consolidated information to a management server, comprising:

periodically sending, by each of the plurality of devices, status information to the other of the plurality of devices on the first network subnet;

receiving and storing, by each of the plurality of devices, status information received from the other of the plurality of devices;

selecting one of the plurality of devices as master; and periodically sending, by the selected master, consolidated status information of the plurality of devices in a consolidated form to the management server.

13. The method of claim 12, further comprising:

receiving, by one of the plurality of devices, server information from the management server; and forwarding, by the one of the plurality of devices, the server information to the other of the plurality of devices on the first network subnet.

14. The method of claim 13, further comprising:

receiving and using, by the selected master, the server information to locate the management server.

15. The method of claim 12, further including a second network subnet and a filter device coupled between the first and second network subnets, further comprising:

filtering from the second network subnet, by the filter device, the consolidated status information periodically sent by each of the plurality of devices to the other of the plurality of devices.

16. The method of claim 15, further comprising:

receiving, by one of the plurality of devices, server information from the management server;

forwarding, by the one of the plurality of devices, the server information to the other of the plurality of devices on the first network subnet; and filtering from the second network subnet, by the filter device, the server information forwarded to the other of the plurality of devices.

17. The method of claim 12, wherein the periodically sending, by the selected master, further comprises sending the consolidated status information if there is a change in any of the consolidated status information.

18. The method of claim 12, wherein the selecting further comprises determining, by each of the plurality of devices, whether it is master based on a common selection criterion that ensures only one master.

19. The method of claim 12, further comprising:

sending, by the selected master, an HyperText Transfer Protocol (HTTP) post transaction with an entity body including the consolidated status information.

20. A network system for consolidating management status information comprising:

a management server having a management database for storing, among other things, status information of network participating devices;

a plurality of network participating devices communicatively coupled to form at least one subnetwork of the network system, each of the plurality of network participating devices within each of the at least one subnetworks exchanging respective status information with the remaining network participating devices within the at least one subnetwork;

selection logic that determines which of the plurality of network participating devices in the at least one subnetwork is master; and forward logic in each of the network participating devices that, if determined to be master, forwards the status information of each of the plurality of network participating devices in the at least one subnetwork onto the network for access by the management server.

21. The network system of claim 20 wherein the exchanging status information among the network participating devices of the at least one subnetwork comprises beacon logic that periodically sends beacon packets onto the at least one subnetwork, each beacon packet including the status information of the network participating devices of the at least one subnetwork.

22. The network system of claim 20 wherein the management server is communicatively coupled to the network apart from the at least one subnetwork of the network participating devices.

23. The network system of claim 20 wherein the forward logic, if it is master, forwards the status information of each of the plurality of network participating devices in the at least one subnetwork onto the network for access by the management server if there is a change in the status information.

24. The network system of claim 20 further comprising at least one management agent that collects the status information and that stores the status information into the management database.

* * * * *